United States Patent [19]

Hata

[11] Patent Number: 5,479,455
[45] Date of Patent: Dec. 26, 1995

[54] CLOCK SYNCHRONOUS SERIAL INFORMATION TRANSFER APPARATUS

[75] Inventor: Masayuki Hata, Itami, Japan

[73] Assignee: Mitsubishi Denki Kabushiki Kaisha, Tokyo, Japan

[21] Appl. No.: 267,345

[22] Filed: Jun. 29, 1994

[30] Foreign Application Priority Data

Jun. 30, 1993 [JP] Japan .................. 5-162415

[51] Int. Cl.$^6$ ............................. H04L 7/00
[52] U.S. Cl. .............. 375/356; 375/357; 370/85.1; 370/100.1
[58] Field of Search ................. 375/118, 119, 375/354; 370/85.1, 85, 100.1, 105.3, 105.5; 327/91, 93, 94, 95

[56] References Cited

U.S. PATENT DOCUMENTS 5,058,143 10/1991 Messenger .................. 375/118
5,256,912 10/1993 Rios ........................... 375/118 X

OTHER PUBLICATIONS

Weitek XL-8220 Processor Data Book, Preliminary Data, Mar. 1990.
Motorola User's Manual Integrated Processor MC68332, Oct. 1991.

Primary Examiner—Stephen Chin
Assistant Examiner—Bryan Webster
Attorney, Agent, or Firm—Lowe, Price, LeBlanc & Becker

[57] ABSTRACT

A clock synchronous serial information transfer apparatus, comprises, a control signal circuit 6 which inputs a clock CLKin, and judges that the same level has continued over a predetermined time to output the judging result as two complementary control signals CLKa and CLKb, latch circuits 9a to 16a operated by a control signal which outputs a high level when the clock CLKin inputted to the control signal circuit 6 has kept the high level, and latch circuits 9b to 16b operated by a control signal which outputs the high level when the clock CLKin inputted to the control signal circuit 6 has kept a low level, whereby data is transmitted and received correctly even when noises occur in the clock CLKin.

10 Claims, 31 Drawing Sheets

CLOCK SYNCHRONOUS SERIAL INFORMATION TRANSFER APPARATUS

BACKGROUND OF THE INVENTION

1. Field of the Invention

The present invention relates to a clock synchronous serial information transfer apparatus comprising, a transmit unit (hereinafter, referred to as a transmit unit of a clocked Serial I/O) and a receiving unit (hereinafter referred to as a receiving unit of a clocked serial I/O, or when designating a clock synchronous serial information transfer apparatus referred to as a clocked serial I/O), and particularly to a clocked serial I/O in the case, where noises occur in a communication reference signal (hereinafter, referred to as a communication clock) for synchronism.

2. Description of the Related Art

In a microcomputer, when communicating information with peripherals and other microcomputers, there are a method of transmitting and receiving data in parallel and a method of transmitting and receiving data in series. In the parallel and serial transmissions and receptions, more data can be transferred per unit time in the case of using the parallel transmitting and receiving. However, when considering a communication cost, more wirings are required in the parallel transmitting and receiving, thus the cost increases. So there is a field accepting the serial transmitting and receiving in which less wirings is required even though a transfer rate is low.

However, also in the serial transmitting and receiving, there are the clocked serial I/O which uses a communication clock and transmits and receives data in synchronism with the communication clock, and an asynchronous serial information transmitting and receiving which transmits and receives data without using the communication clock. Also in this case, the transfer rate and the number of wirings are related to each other; the higher transfer rate is the clocked serial I/O and the less wirings is the asynchronous serial information transmitting and receiving. And hence, in the field where the wirings are few and the transfer rate is high, the clocked serial I/O is frequently used.

Next, the operation of the above-mentioned clocked serial I/O is briefly described.

FIG. 1 is a schematic view showing connection between the transmit unit and the receiving unit of the clocked serial I/O.

In FIG. 1, numeral 1 designates the transmit unit of the clocked serial I/O, numeral 2 designates the receiving unit of the clocked serial I/O, numeral 3 designates the communication clock outputted from the receiving unit 2 of the clocked serial I/O and inputted to the transmit unit 1 of the clocked serial I/O, numeral 4 designates a communication enable outputted from the transmit unit 1 of the clocked serial I/O and inputted to the receiving unit 2 of the clocked serial I/O, and numeral 5 designates communication data outputted from the transmit unit 1 of the clocked serial I/O and inputted to the receiving unit 2 of the clocked serial I/O.

The operation is described with reference to a timing chart shown in FIG. 2. In the timing chart shown in FIG. 2, a signal flow is shown as a time lapse from left to right.

When the transmit unit 1 of the clocked serial I/O transmits data "b00110110" (b indicates that following numerals are binary), at first, the communication enable 4 is changed to a low level from a high level. The receiving unit 2 of the clocked serial I/O starts the communication clock 3 when recognizing that the communication enable 4 is at the low level. Responding to the low level of the communication clock 3, the transmit unit 1 of the clocked serial I/O brings the communication enable 4 to the high level, and outputs the low level as the communication data 5. The receiving unit 2 of the clocked serial I/O brings the communication clock 3 to the high level, and receives information of the communication data 5 at the timing thereof. Since it is at the low level in this case, "0" is recognized.

Next, in order to have the next data being transferred, the receiving unit 2 of the clocked serial I/O brings the communication clock 3 to the low level. Since the transmit unit 1 of the clocked serial I/O transmits the next data "0" responding to the low level of the communication clock 3, the communication data 5 is kept at the low level. Next, the receiving unit 2 of the clocked serial I/O brings the communication clock 3 to the high level, and receives information of the communication data 5 at the timing thereof. Since it is at the low level in this case, "0" is recognized.

Next, the receiving unit 2 of the clocked serial I/O brings the communication clock 3 to the low level to have the third data being transferred. Responding to the low level of the communication clock 3, the transmit unit 1 of the clocked serial I/O brings the communication data 5 to the high level to transmit the next data "1". The receiving unit 2 of the clocked serial I/O brings the communication clock 3 to the high level, and receives information of the communication data 5 at the timing thereof. Since it is at the high level in this case, "1" is recognized. As such, the receiving unit 2 of the clocked serial I/O receives fourth to eighth data, thereby the data "b00110110" is transferred.

Next, a circuit configuration in the transmit unit 1 of the clocked serial I/O, and the operation to output data responsive to the communication clock 3 are described with reference to FIG. 3 and FIG. 4.

In FIG. 3, numeral 6 designates a control signal circuit, which receives an input signal and outputs two control signals. The control signal circuit 6 is constituted by a NAND element 7 which obtains a NAND logic of the communication clock 3 and an enable signal, which decides to operate the transmit unit 1 of the clocked serial I/O or not, and an inverter element 8 which inverts an output of the NAND element 7.

Numerals 9a to 16a and 9b to 16b designate latch circuits which change outputs thereof responsive to the control signals outputted from the control signal circuit 6. Where, the control signal outputted from the inverter element 8 of the control signal circuit 6 controls the latch circuits 9a to 16a, and the control signal outputted from the NAND element 7 of the control signal circuit 6 controls the latch circuits 9b to 16b.

These latch circuits are interconnected as follows; an output of the latch circuit 16a is inputted to the latch circuit 16b, an output of which is inputted to the latch circuit 15a, an output of which is inputted to the latch circuit 15b, an output of which is inputted to the latch circuit 14a, an output of which is inputted to the latch circuit 14b, an output of which is inputted to the latch circuit 13a, an output of which is inputted to the latch circuit 13b, an output of which is inputted to the latch circuit 12a, an output of which is inputted to the latch circuit 12b, an output of which is inputted to the latch circuit 11a, an output of which is inputted to the latch circuit 11b, an output of which is inputted to the latch circuit 10a, an output of which is inputted to the latch circuit 10b, an output of which is inputted to the latch circuit 9a, and an output of which is inputted to the latch circuit 9b. An output Dout of the latch circuit 9b is outputted as the communication data 5.

For the convenience' sake of description, the signals are coded so that FIG. 3 and FIG. 4 correspond with each other. An output of the inverter element 8 is designated CLKa, and an output of the NAND element 7 is designated CLKb, the output of the latch circuit 9a is designated a, the output of the latch circuit 10b is designated b, the output of the latch circuit 10a is designated c, and output of the latch circuit 11b is designated d, the output of the latch circuit 11a is designated e, the output of the latch circuit 12b is designated f, the output of the latch circuit 12a is designated g, the output of the latch circuit 13b is designated h, the output of the latch circuit 13a is designated i, the output of the latch circuit 14b is designated j, the output of the latch circuit 14a is designated k, the output of the latch 15b is designated l, the output of the latch circuit 15a is designated m, the output of the latch circuit 16b is designated n and the output of the latch circuit 16a is designated o.

Since occurrence of noises in the communication clock 3 is different at the time point outputted from the receiving unit 2 of the clocked serial I/O and at the time point inputted to the transmit unit 1 of the clocked serial I/O, the communication clock 3 seen at the transmit unit 1 of the clocked serial I/O is designated CLKin to distinguish the difference.

FIG. 5 shows an example of configuration of the latch circuit 9a to 16a and 9b to 16b.

In this example, the latch circuits are that, when an input signal to a control terminal CT is at the high level, a data value inputted to an input terminal IT is outputted intact to an output terminal OT, and when the input signal to the control terminal CT is at the low level, a value being outputted at that time point is continuously outputted from the output terminal OT independently of the state of input data to the input terminal IT.

Next, the operation of the configuration shown in FIG. 3 is described using the same data "b00110110" as the case of the description of FIG. 1.

At first, data are latched in the latch circuits as follows; "0" is latched in the latch circuit 10b, "0" is latched in the latch circuit 11b, "1" is latched in the latch circuit 12b, "1" is latched in the latch circuit 13b, "0" is latched in the latch circuit 14b, "1" is latched in the latch circuit 15b, "1" is latched in the latch circuit 16b and "0" is latched in the latch circuit 16a.

Since the CLKa is valid and the CLKb is invalid, outputs from the latch circuits are that; a is "0", b is "0", c is "0", d is "0", e is "1", f is "1", g is "1", h is "1, i is "0", j is "0", k is "1", l is "1", m is "1", n is "1" and o is "0".

This state is a state shown in a leftmost first cycle in FIG. 4. Hereupon, though the output Dout is designated "X", it means that the output Dout may be either "1" or "0".

Next, when the communication clock 3 changes to the low level from the high level, the CLKin transits to the low level from the high level, responding thereto the CLKa changes to invalid from valid and the CLKb changes to valid from invalid. Thereby, the latch circuits 9a to 16a latch the inputs respectively and the latch circuits 9b to 16b transmit the inputs to the outputs respectively.

This state is a state shown in a second cycle in FIG. 4. The outputs are that, Dout is "0", a is "0", b is "0", c is "0", d is "1", e is "1", f is "1", g is "1", h is "0", i is "0", j is "1", k is "1", l is "1", m is "1", n is "0" and o is "0". Data are shifted between the latch circuits in such a manner.

The case where the noises occur in the communication clock 3 is described. This state is shown in a sixth cycle and a ninth cycle in FIG. 4.

In the case of sixth cycle, the noise occurs at the low level of the communication clock 3, and the CLKin instantaneously becomes high level, the CLKa becomes high level instantaneously and the CLKb becomes low level instantaneously. In this case, as is shown in FIG. 4, data proceeds by one. In such case, data received by the receiving unit 2 of the clocked serial I/O is finally "b001010XX", and the data is not transmitted and received correctly.

As such, in the conventional apparatus, such a problem was encountered that, when the noise occurs in the communication clock 3, erroneous data is transmitted and received.

SUMMARY OF THE INVENTION

The present invention has been devised to solve the problems as mentioned above, therefore, it is an object thereof to obtain a highly reliable clock synchronous serial information transfer apparatus, whereby data is transmitted and received correctly.

A transmit unit of a clock synchronous serial information transfer apparatus of a first invention transmits an information signal from a transmitting terminal in synchronism with a clock given from a receiving unit, and comprises: a control signal circuit, which generates a first control signal and a second control signal whose valid/invalid relation is complementary, responsive to a level transition of the clock; first signal holding circuits, to whose control terminals the first control signal is given from the control signal circuit, and whose output terminals are connected to the transmitting terminals, which, when the first control signal given to the control terminals is valid, input and output the signal given to the input terminals to the output terminals, and when the first control signal given to the control terminals is invalid, continuously output the signal outputted from the output terminals at that time point; and second signal holding circuits, to whose control terminals the second control signal is given from the control signal circuit, and whose input terminals of the first signal holding circuits are connected to output terminals, which, when the second control signal given to the control terminals is valid, output the input signal to the output terminals, and when the second control signal given to the control terminals is invalid, continuously output the signal outputted from the output terminals at that time point; wherein the control signal circuit, comprises detecting means for detecting a level transition, only when a state after the transition continuous over a predetermined time, when the level transition of the clock has occurred, and changes valid/invalid of the first control signal and second control signal when the detecting means detects the level transition of the clock.

A receiving unit of a clock synchronous serial information transfer apparatus of a second invention receives an information signal transmitted from the transmit unit in synchronism with a clock generated by itself from a receiving terminal, and comprises: a control signal circuit, which generates a first control signal and a second control signal whose valid/invalid relation is complementary responsive to a level transition of the clock; first signal holding circuits, to whose control terminals the first control signal is given from the control signal circuit, and whose input terminals are connected to the receiving terminal, which, when the first control signal given to the control terminals is valid, store the signal given to the input terminals, and when the first control signal given to the control terminals is invalid, output the signal stored therein at that time point; and second signal holding circuits, to whose control terminals the second control signal is given from the control signal circuit, and whose input terminals are connected to the output terminal of the first signal holding circuits, which, when the second control signal given to the control terminals is valid, store the signal given to the input terminals, and when the second control signal given to the control terminals is invalid, output the signal stored therein at that time point; wherein the control signal circuit, comprises detecting means for detecting a level transition, only when a state after the transition continues over a predetermined time, when the level transition of the clock has occurred, and changes valid/invalid of the first control signal and second control signal when the detecting means detects the level transition of the clock.

A transmit unit of a clock synchronous serial information transfer apparatus of a third invention transmits an information signal from a transmitting terminal in synchronism with a clock given from a receiving unit, and comprises: a first control signal circuit which outputs a first control signal responsive to a level transition of the clock; a second control signal circuit which outputs a second control signal responsive to a level transition of the clock; first signal holding circuits, to whose control terminals the first control signal is given from the first control signal circuit, and whose output terminals are connected to the transmitting terminals, which, when the first control signal given to the control terminals is valid, input and output the signal given to the input terminals to the output terminals, and when the first control signal given to the control terminals is invalid, continuously output the signal outputted at that time point as it is; and second signal holding circuits, to whose control terminals the second control signal is given from the second control signal circuit, and whose input terminals of the first signal holding circuits are connected to output terminals, which, when the second control signal given to the control terminals is valid, output the input signal to the output terminals, and when the second control signal given to the control terminals is invalid, continuously output the signal outputted from the output terminals at that time point as it is; wherein the first control signal output circuit comprises means for delaying a time point at which the first control signal becomes valid responsive to the level transition of the clock from a second level to a first level, than a time point at which the first control signal becomes invalid responsive to the level transition of the clock from the first level to the second level, and the second control signal output circuit comprises means for delaying a time point at which the second control signal becomes valid responsive to the level transition of the clock from the first level to the second level, than a time point at which the second control signal becomes invalid responsive to the level transition of the clock from the second level to the first level.

A receiving unit of a clock synchronous serial information transfer apparatus of a fourth invention receives an information signal transmitted from the transmit unit in synchronism with a clock generated by itself from a receiving terminals, and comprises; a first control signal output circuit which outputs a first control signal responsive to a level transition of the clock; a second control signal output circuit which outputs a second control signal responsive to a level transition of the clock; first signal holding circuits, to whose control terminals the first control signal is given from the first control signal circuit, and whose input terminals are connected to the receiving terminal, which, when the first control signal given to the control terminals is valid, store the signal given to the input terminals, and when the first control signal given to the control terminals is invalid, output the signal stored therein at that time point; and second signal holding circuit, to whose control terminal the second control signal is given from the second control signal circuit, and whose input terminals are connected to output terminal of the first signal holding circuits, which, when the second control signal given to the control terminals is valid, store the signal given to the input terminals, and when the second control signal given to the control terminals is invalid, output the signal stored therein at that time point; wherein the first control signal output circuit comprises means for delaying a time point at which the first control signal becomes valid responsive to the level transition of the clock from a second level to a first level, than a time point at which the first control signal becomes invalid responsive to the level transition of the clock from the first level to the second level, and the second control signal output circuit comprises means for delaying a time point at which the second control signal becomes valid responsive to the level transition of the clock from the first level to the second level, than a time point at which the second control signal becomes invalid responsive to the level transition of the clock from the second level to the first level.

A transmit unit of a clock synchronous serial information transfer apparatus of a fifth invention transmits an information signal from a transmitting terminal in synchronism with a clock given from a receiving unit, and comprises: a clock input terminal which inputs the clock; a first signal holding circuit which has input terminal, control terminal and output terminal connected to the transmitting terminal, and which, when a valid control signal is given to the control terminal, makes the input signal to the input terminal be the output signal from the output terminal, and when an invalid control signal is given to the control terminal, makes the input signal to the input terminal at the time point, where the valid control signal is given to the control terminal, be the output signal from the output terminal; second signal holding circuits which have input terminals, control terminals and output terminals connected to the input terminal of the first signal holding circuits, and which, when a valid control signal is given to the control terminals, make the input signals to the input terminals be the output signals from the output terminals, and when an invalid control signal is given to the control terminals, make the input signals to the input terminals at the time point, where the valid control signal is given to the control terminals, be the output signals from the output terminals; and third signal holding circuits which have input terminals, control terminals and output terminals connected to the input terminals of the second signal holding circuits, and which, when a valid control signal is given to the control terminals, make the input signals to the input terminals be the output signals from the output terminals, and when an invalid control signal is given to the control terminals, make the input signals to the input terminals at the time point, where the valid control signal is given to the control terminals, be the output signals from the output terminals; further comprising: a control output circuit, which has an input terminal connected to the clock input terminal, a first control output terminal connected to the control terminals of the first signal holding circuits, a second control output terminal connected to the control terminals of the second signal holding circuits, a third control output terminal connected to the control terminal of the third signal holding circuit, and which, responsive to a level transition of the clock from a first level to a second level inputted to the clock input terminal, outputs a valid control signal from the first control output terminal, outputs an invalid control signal from the second control output terminal, and outputs a valid control signal from the third control output terminal at a time point later than a time point when the valid control signal is outputted from the first control output terminal, and a time point when the invalid control signal is outputted from the second control output terminal, and which, responsive to a level transition of the clock from the second level to the first level inputted to the clock input terminal, outputs an invalid control signal from the first control output terminal, outputs an invalid control signal from the third control output terminal, and outputs a valid control signal from the second control output terminal at a time point later than a time point when the invalid control signal is outputted from the first control output terminal, and a time point when the invalid control signal is outputted from the third control output terminal.

In the transmit unit of the clock synchronous serial information transfer apparatus of the first invention, when the clock level transition has occurred, the signal is propagated between the first and second signal holding circuits holding the information signal to be transmitted for transmission, only when the level transition has continued over a predetermined time, and the influence of noise is eliminated.

In the receiving unit of the clock synchronous serial information transfer apparatus of the second invention, when the clock level transition has occurred, the signal is propagated between the first and second signal holding circuits holding the received information signal for reception, only when the level transition has continued over a predetermined time, and the influence of noise is eliminated.

In the receiving unit of the clock synchronous serial information transfer apparatus of the third invention, when the clock level transition has occurred, the change of valid/ invalid of the control signal which controls the first and second signal holding circuits is delayed to propagate the signal between the first and second signal holding circuits holding the received information signal for transmission, and the influence of noise is eliminated.

In the transmit unit of the clock synchronous serial information transfer apparatus of the fourth invention, when the clock level transition has occurred, the change of valid/ invalid of the control signal which controls the first and second signal holding circuits is delayed to propagate the signal between the first and second signal holding circuits holding the information signal to be transmitted for transmission, and the influence of noise is eliminated.

In the transmit unit of the clock synchronous serial information transfer apparatus of the fifth invention, the operation is the combined operation of the fourth and fifth invention.

The above and further objects and features of the invention will more fully be apparent from the following detailed description with accompanying drawings.

DESCRIPTION OF THE PREFERRED EMBODIMENTS

Embodiment 1

Though one embodiment of the present invention is described in the following, since the simple operation is similar to a conventional example described with reference to FIG. 1, the detailed operation is described with reference to a block diagram of a transmit unit of a clocked serial I/O of the first embodiment of the present invention shown in FIG. 6.

Figure 6:
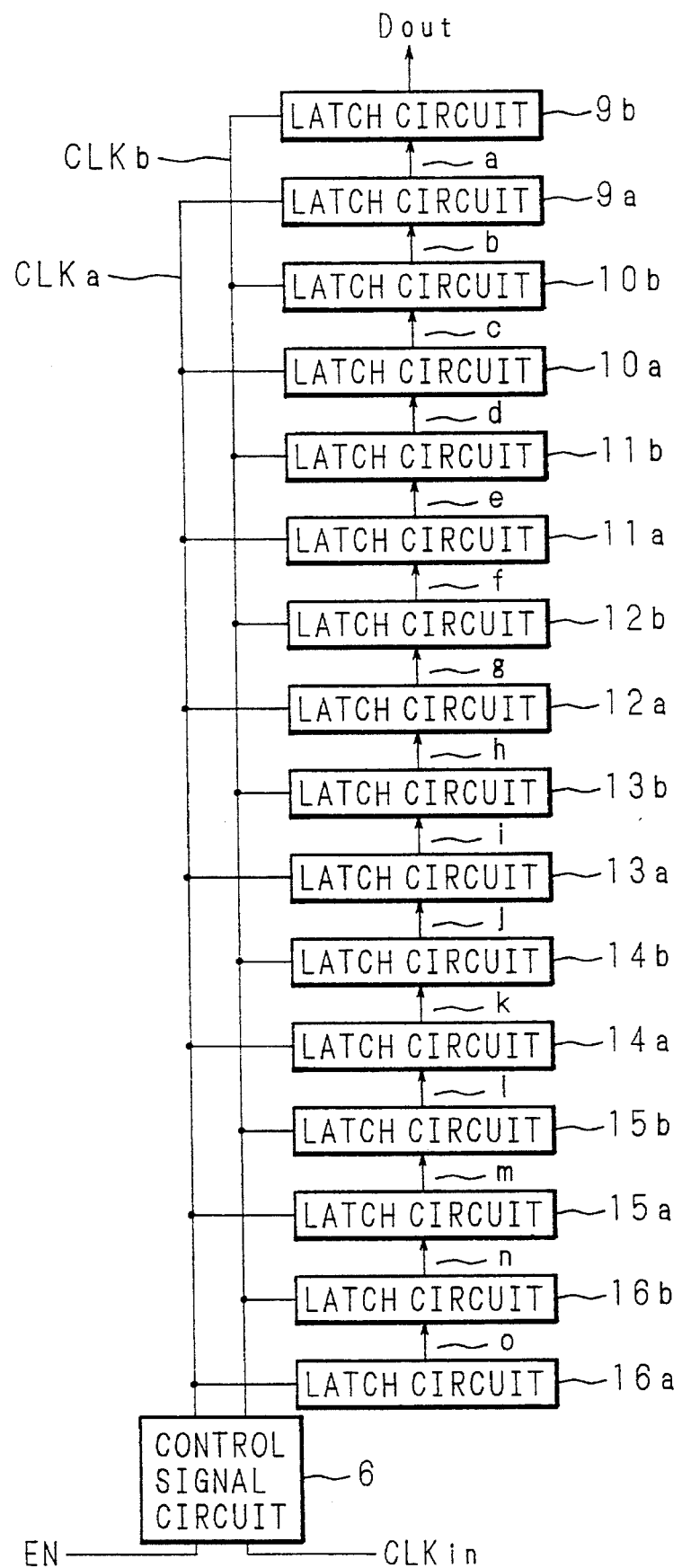
FIG. 6 is a block diagram showing an example of configuration of a transmit unit of a first invention.

In FIG. 6, numeral 6 designates a control signal circuit, which judges whether a same potential has continued in a clock CLKin, which is an input signal, or not, and outputs the judging result to two control signals which are in a complementary relation. An internal configuration of the control signal circuit 6 is to be described later.

Numerals 9a to 16a and 9b to 16b designate latch circuits which change outputs thereof responsive to control signals outputted from the control signal circuit 6. Where, the latch circuits 9a to 16a are operated by the control signal which outputs a high level when an input to the control signal circuit 6 keeps the high level, and the latch circuits 9b to 16b are operated by the control signal which output the high level when the input to the control signal circuit 6 keeps a low level.

These latch circuits are interconnected as follows; an output of the latch circuit 16a is inputted to the latch circuit 16b, an output of the latch circuit 16b is inputted to the latch circuit 15a, an output of the latch circuit 15a is inputted to the latch circuit 15b, an output of the latch circuit 15b is inputted to the latch circuit 14a, an output of the latch circuit 14a is inputted to the latch circuit 14b, an output of the latch circuit 14b is inputted to the latch circuit 13a, an output of the latch circuit 13a is inputted to the latch circuit 13b, an output of the latch circuit 13b is inputted to the latch circuit 12a, an output of the latch circuit 12a is inputted to the latch circuit 12b, an output of the latch circuit 12b is inputted to the latch circuit 11a, an output of the latch circuit 11a is inputted to the latch circuit 11b, an output of the latch circuit 11b is inputted to the latch circuit 10a, an output of the latch circuit 10a is inputted to the latch circuit 9a, and an output of the latch circuit 9a is inputted to the latch circuit 9b. An output Dout of the latch circuit 9b is outputted as communication data 5.

Next, though the operation of the transmit unit of the clocked serial I/O shown in FIG. 6 is described with reference to the timing chart shown in FIG. 7, for the convenience' sake of description, the signals are coded so that FIG. 6 and FIG. 7 correspond with each other.

Outputs of the control signal circuit 6 are respectively designated CLKa and CLKb, the output of the latch circuit 9a is designated a, the output of the latch circuit 10b is designated b, the output of the latch circuit 10a is designated c, the output of the latch circuit 11b is designated d, the output of the latch circuit 11a is designated e, the output of the latch circuit 12b is designated f, the output of the latch circuit 12a is designated g, the output of the latch circuit 13b is designated h, the output of the latch circuit 13a is designated i, the output of the latch circuit 14b is designated j, the output of the latch circuit 14a is designated k, the output of the latch circuit 15b is designated l, the output of the latch circuit 15a is designated m, the output of the latch circuit 16a is designated n and the output of the latch circuit 16a is designated o.

Since occurrence of noises in the communication clock 3 is different between the time point outputted from the receiving unit 2 of the clocked serial I/O and at the time point inputted to the transmit unit 1 of the clocked serial I/O, the communication clock 3 seen at the transmit unit 1 of the clocked serial I/O is designated CLKin to distinguish the difference.

Figure 1:
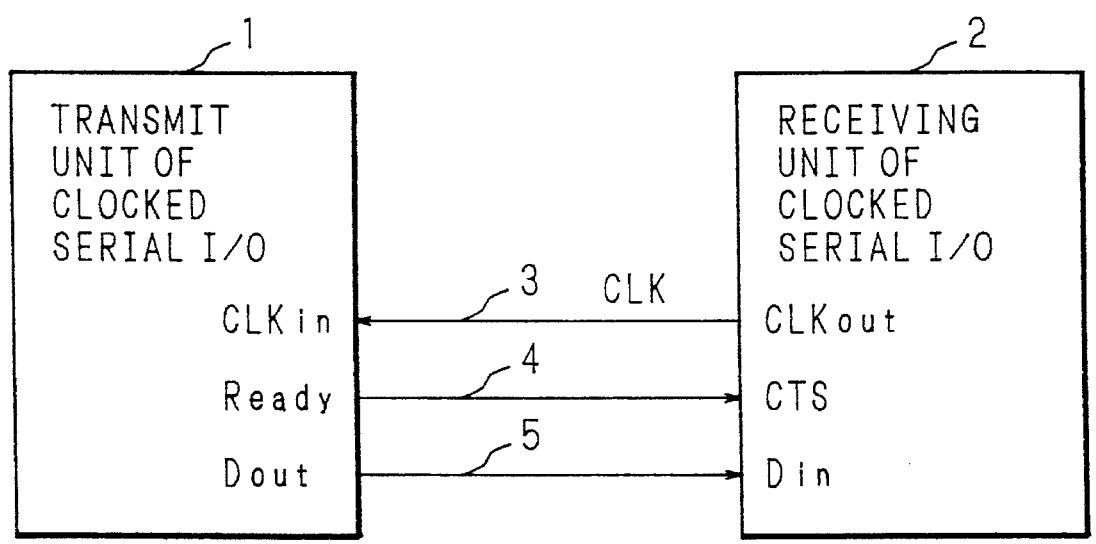
FIG. 1 is a block diagram showing a general system configuration of a conventional clocked serial I/O and that of the present invention.
Figure 2:
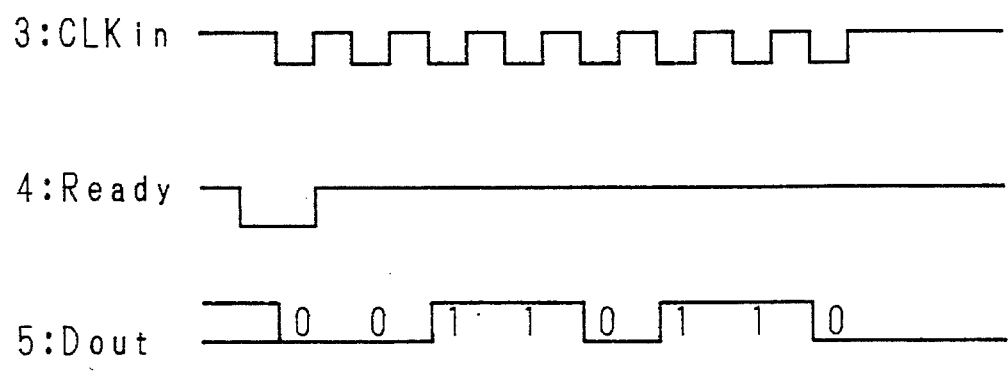
FIG. 2 is a timing chart showing an example of operation of a system configuration of FIG. 1.
Figure 3:
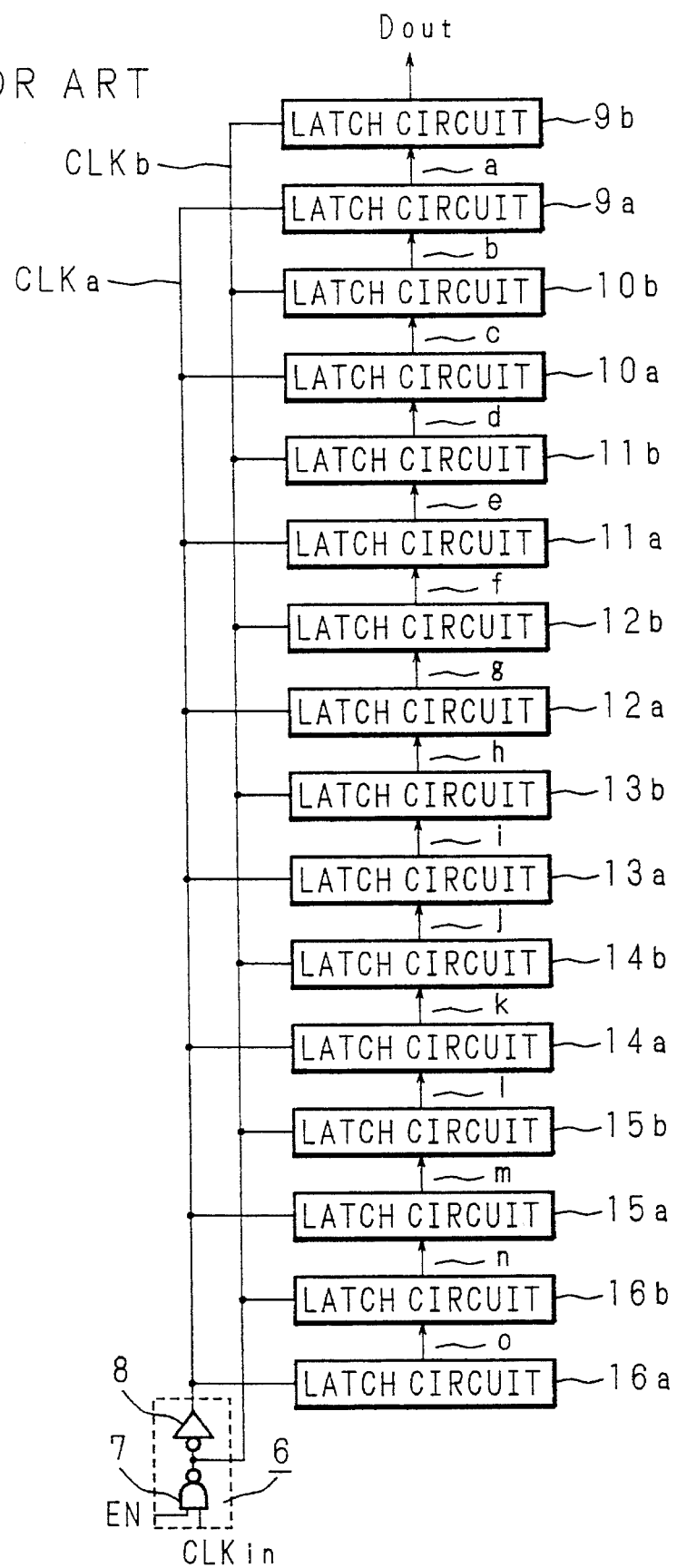
FIG. 3 is a block diagram showing a configuration of a transmit unit of a conventional clocked serial I/O.
Figure 4:
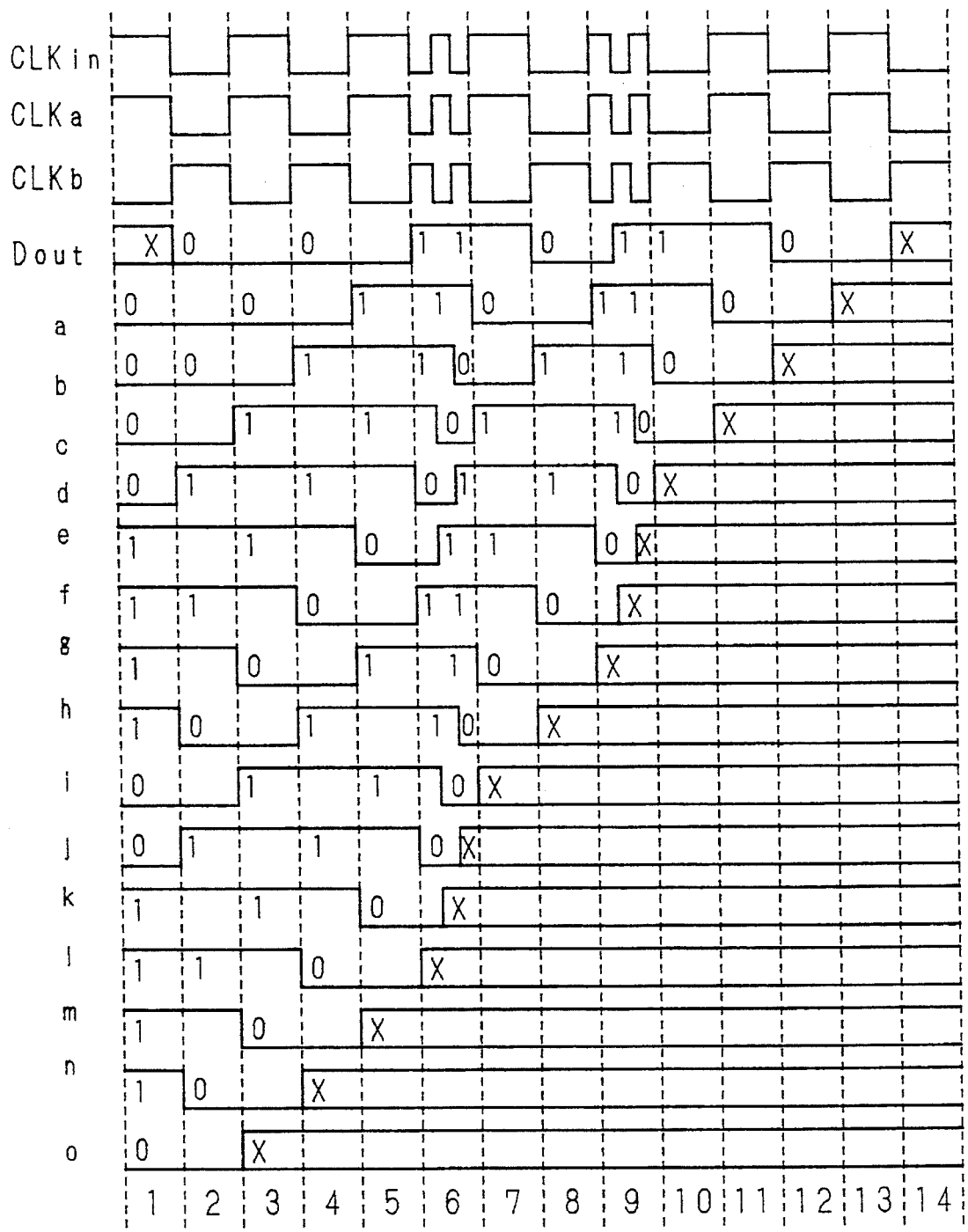
FIG. 4 is a timing chart showing an example of operation of a transmit unit of FIG. 3.
Figure 5:
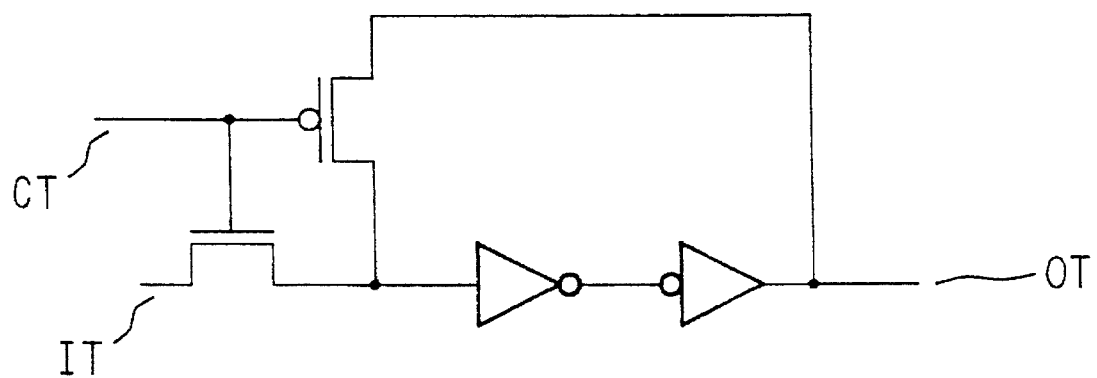
FIG. 5 is a circuit diagram of an example of configuration of latch circuits of a transmit unit of FIG. 3.

Next, the operation of the configuration shown in FIG. 6 is described using the same data "b00110110" as the case of the description of FIG. 1.

At first, data are latched in the latch circuits as follows; "0" is latched in the latch circuit 10b, "0" is latched in the latch circuit 11b, "1" is latched in the latch circuit 12b, "1" is latched in the latch circuit 13b, "0" is latched in the latch circuit 14b, "1" is latched in the latch circuit 15b, "1" is latched in the latch circuit 16b and "0" is latched in the latch circuit 16a.

Since the CLKa is valid and the CLKb is invalid, outputs from the latch circuits are that, a is "0", b is "0", c is "0", d is "0", e is "1", f is "1", g is "1", h is "1", i is "0", j is "0", k is "1", l is "1", m is "1", n is "1" and o is "0".

Figure 7:
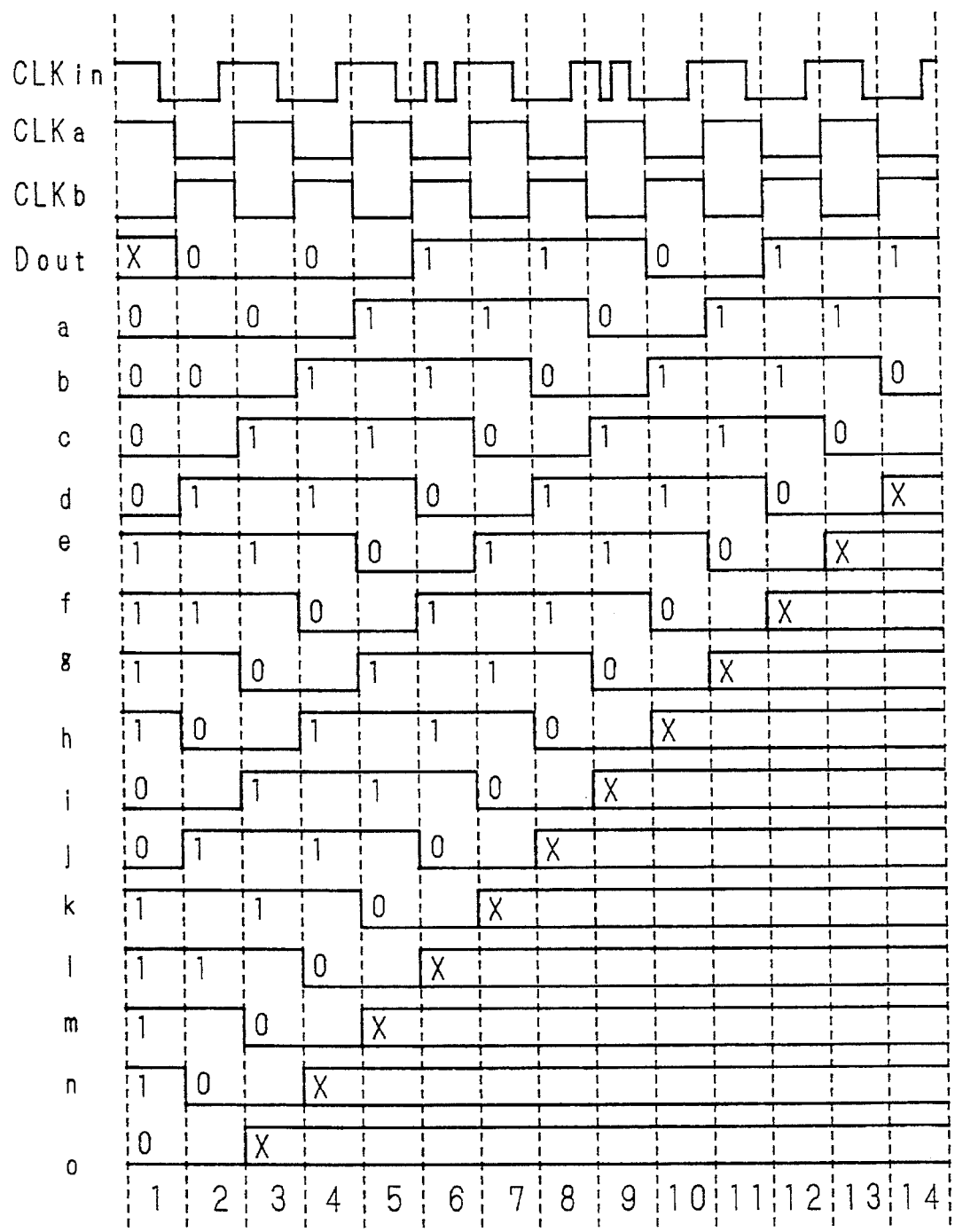
FIG. 7 is a timing chart showing an example of operation of a transmit unit of FIG. 6.

This state is a state shown in a left most first cycle in FIG. 7. Hereupon, though the output Dout is designated "X", it means that the output Dout may be either "1" or "0".

Next, when the communication clock 3 changes to the low level from the high level, the clock CLKin transits to the low level from the high level, and the control signal circuit 6 judges that this level has continued, and changes the CLKa to the invalid from the valid and the CLKb to the valid from the invalid. Thereby, the latch circuits 9a to 16a latch the inputs thereof and the latch circuits 9b to 16b transmit the inputs to the outputs respectively.

This state is a state shown in a second cycle in FIG. 7. The outputs are that, Dout is "0", a is "0", b is "0", c is "0", d is "1", e is "1", f is "1", g is "1", h is "0", i is "0", j is "1", k is "1", l is "1", m is "1", n is "0" and o is "0".

As such, data are shifted between the latch circuits as slightly delaying with respect to edges of the CLKin.

Next, the case where the noises occur in the communication clock 3 is described. This state is shown in a sixth cycle and a ninth cycle in FIG. 7.

In the case of sixth cycle, the noise occurs at the low level of the communication lock 3, and though the CLKin instantaneously becomes high level, as this state does not continue, the CLKa keeps the low level and the CLKb keeps the high level. As such, finally, data received by the receiving unit 2 of the clocked serial I/O becomes "b00110110", and the data is transmitted and received correctly.

Next, an example of configuration of the control signal circuit 6 is described with reference to FIG. 8 and FIG. 9.

Figure 8:
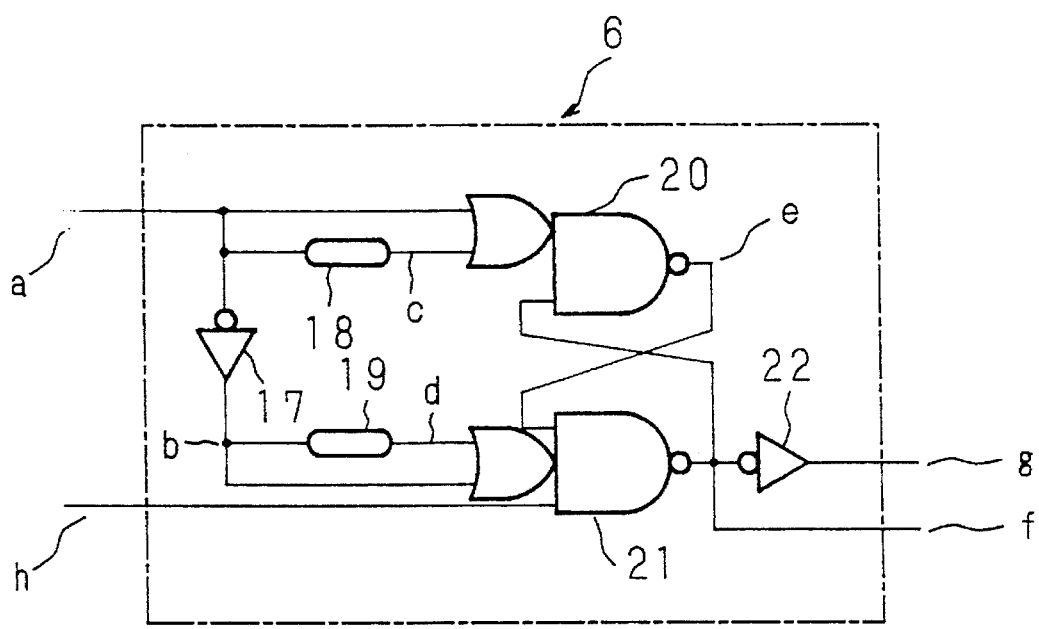
FIG. 8 is a circuit diagram showing an example of logical configuration of a control signal circuit of a transmit unit of a first invention.

In FIG. 8, numeral 17 designates an inverter element which inverts the clock CLKin, which is an input signal to the control signal circuit 6, numeral 18 designates a delay element which delays the clock CLKin, and numeral 19 designates a delay element which delays an output of the inverter element 17.

Numeral 20 designates a composite gate which obtains an AND logic of the other input and an OR logic of the clock CLKin and an output of the delay element 18, and numeral 21 designates a composite gate which obtains an AND logic of an OR logic of the output of the inverter element 17 and the output of the delay element 18, and an output of the composite gate 20 and an enable signal, an output of the composite gate 21 is connected to another input of the composite gate 20.

Numeral 22 designates an inverter element which inverts the output of the composite gate 21.

In FIG. 8, the clock CLKin, which is an input signal to the control signal circuit 6, is coded a, the output of the inverter element 17 is coded b, the output of the delay element 18 is coded c, an output of the delay element 19 is coded d, the output of the composite gate 20 is coded e, the output of the composite gate 21 is coded f, an output of the inverter element 22 is coded g, and the enable signal is coded h.

Next, the operation of the control signal circuit 6 shown in FIG. 8 is described.

The output e of the composite gate 20 becomes in the high level, when either the output c of the delay element 18 and the input signal a to the control signal circuit 6 are both at the low level (a first state), or the output f of the composite gate 21 is at the low level (a second state). The output f of the composite gate 21 becomes in the high level, when either the output d of the delay element 19 and the output b of the inverter element 17 are both at the low level (a third state), or the output e of the composite gate 20 is at the low level (a fourth state), or the enable signal h is at the low level (a reset state).

Assuming the above-mentioned fact, when the input signal a to the control signal circuit 6 is a high level, the output b of the inverter element 17 is at the low level, the output c of the delay element 18 is at the high level and the output d of the delay element 19 is at the low level. That is, as the output b of the inverter element 17 as well as the output d of the delay element 19 are at the low level, the above-mentioned third state is attained, thus the output f of the composite gate 21 changes to the high level and the output g of the inverter element 22 changes to the low level.

Figure 9:
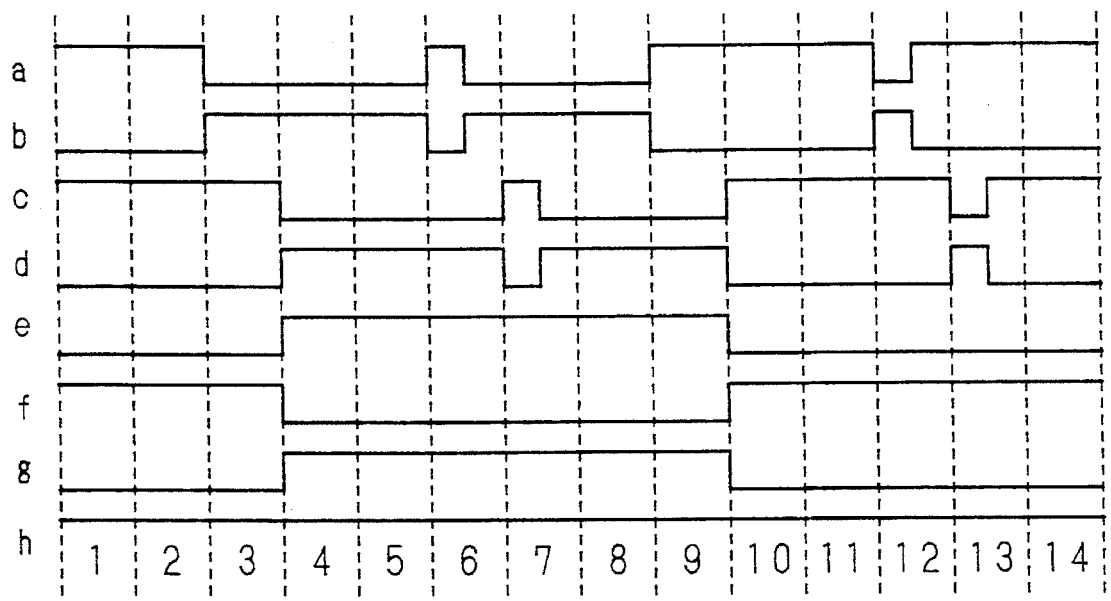
FIG. 9 is a timing chart showing an example of operation of a diagram of FIG. 8.

This state is shown in the first and second cycles in FIG. 9.

Next, though the output b of the inverter element 17 changes to the high level when the input signal a to the control signal circuit 6 changes to the low level, the change of input is still not transmitted, thus the output c of the delay element 18 is kept at the low level, and the output d of the delay element 19 is also kept at the low level. And hence, the output e of the composite gate 20 and the output f of the composite gate 21 keep the existing value. Specifically, the output f of the composite gate 21 is at the high level and the output g of the inverter element 22 is at the low level.

This state is shown in a third cycle in FIG. 9.

Next, when the input a to the control signal circuit 6 keeps the low level, the output c of the delay element 18 and the outputted of the delay element 19 change. Specifically, the output c of the delay element 18 changes to the low level and the output d of the delay element 19 changes to the high level. Thereby, since the aforementioned first state is attained, the output e of the composite gate 20 changes to the high level, the output f of the composite gate 21 changes to the low level, and the output g of the inverter element 22 changes to the high level.

This state is shown in the fourth and fifth cycles in FIG. 9.

Next, when the input signal a to the control signal circuit 6 returns to the low level immediately after changing once to the high level, the output b of the inverter element 17 instantaneously changes to the low level, and returns to the high level. However, since the change of input is not transmitted, the output c of the delay element 18 and the output d of the delay element 19 respectively keep the previous values. Thus, the output f of the composite gate 21 as well as the output g of the inverter element 22 do not change.

This state is shown in a sixth cycle in FIG. 9.

Next, the transition of the input is transmitted to the delay elements 18 and 19, thus the output c of the delay element 18 changes instantaneously to the high level, and the output d of the delay element changes instantaneously to the low level, and thereafter return to the original state. However, since the input signal a to the control signal circuit 6 and the output b of the inverter element 17 are respectively at the low level and the high level, the outputs of the composite gates 20 and 21 do not change. Thus, the output f of the composite gate 21 keeps the low level, and the output g of the inverter element 22 keeps the high level.

This state is shown in a seventh cycle in FIG. 9.

Hereinafter, the ninth to fourteenth cycles in FIG. 9 also show the same operation results.

As such, the control signal circuit 6, wherein the outputs are not affected by the short time change of the CLKin, is obtained.

Figure 10:
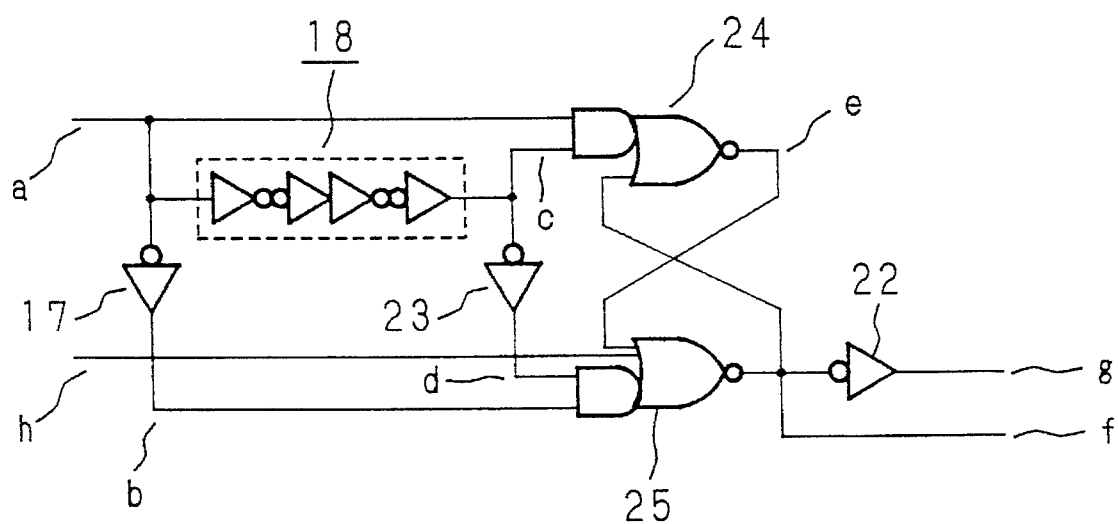
FIG. 10 is a circuit diagram showing an example of another logical configuration of a control signal circuit of the present invention.
Figure 11:
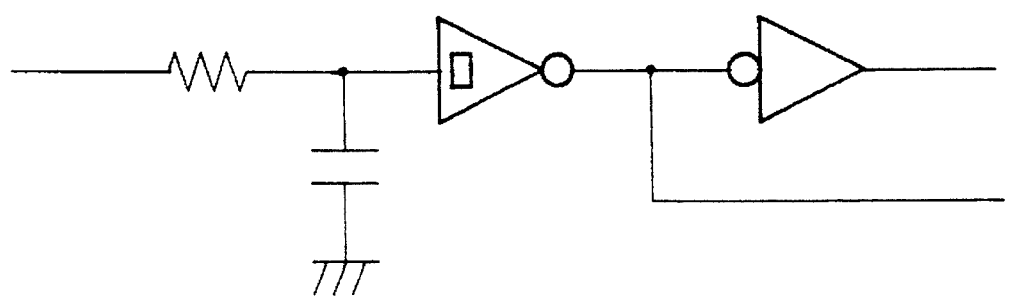
FIG. 11 is a circuit diagram showing an example of still another logical configuration of a control signal circuit of the present invention.

Examples of configuration of the other control signal circuits are shown in FIG. 10 and FIG. 11.

FIG. 10 shows the example, wherein NOR elements are used as a base as the composite gates, and FIG. 11 shows the example, wherein a resistance, a capacitance and Schmitt-type inverter elements are used.

Embodiment 2

Next, a second embodiment of the present invention is described.

Figure 12:
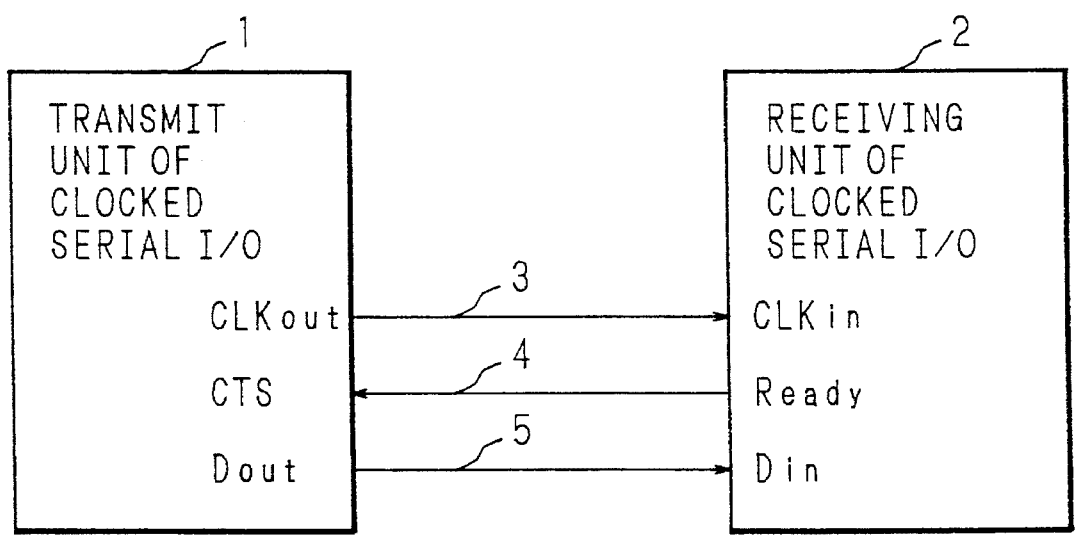
FIG. 12 is a block diagram showing a system configuration of a clocked serial I/O of the present invention.

FIG. 12 is a block diagram showing connections between a transmit unit and a receiving unit of a clocked serial I/O of the second embodiment of the present invention.

In FIG. 12, numeral 1 designates a transmit unit of a clocked serial I/O, numeral 2 designates a receiving unit of the clocked serial I/O, numeral 3 designates a communication clock, which is outputted from the transmit unit 1 of the clocked serial I/O and inputted to the receiving unit 2 of the clocked serial I/O, numeral 4 designates a communication enable which is outputted from the receiving unit 2 of the clocked serial I/O and inputted to the transmit unit 1 of the clocked serial I/O, and numeral 5 designates a communication data outputted from the transmit unit 1 of the clocked serial I/O and inputted to the receiving unit 2 of the clocked serial I/O.

Figure 13:
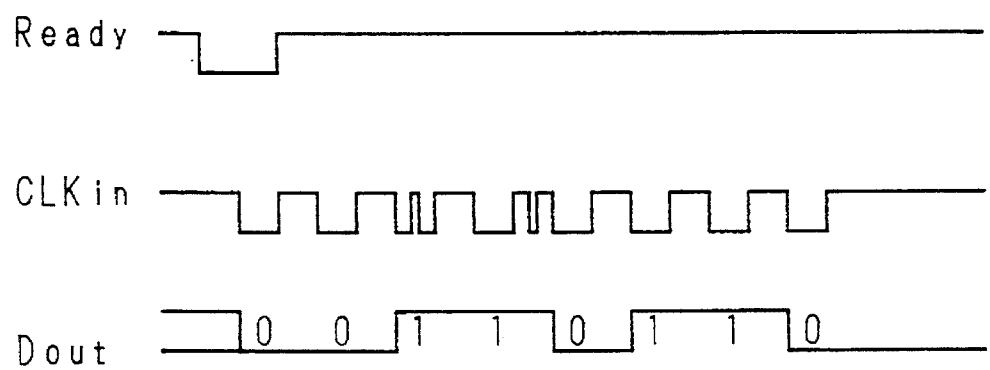
FIG. 13 is a timing chart showing an example of operation of a system configuration of FIG. 12.

The operation of the second embodiment of the present invention shown in FIG. 12 is described with reference to a timing chart shown in FIG. 13. In the timing chart shown in FIG. 13, the signal flow is shown in as a time lapse from left to right.

When the receiving unit 2 of the clocked serial I/O is ready to receive information, the communication enable is brought to the low level from the high level. When the transmit unit 1 of the clocked serial I/O is to transmit data "b00110110" and the communication enable 4 is at the low level, the communication clock 3 is started to transmit the data. At first, since the first data is "0", the transmit unit 1 of the clocked serial I/O outputs the low level to the communication data 5. Responding to the low level of the communication clock 3, the receiving unit 2 of the clocked serial I/O brings the communication enable 4 to the high level, and when the communication clock 3 keeps the high level, receives data of the communication data 5 at that timing. In this case, since it is at the low level, the receiving unit 2 of the clocked serial I/O recognizes "0".

Next, the transmit unit 1 of the clocked serial I/O brings the communication clock 3 to the low level, and keeps the communication data 5 as it is at the low level to transmit the next data "0". The receiving unit 2 of the clocked serial I/O receives data of the communication data 5 at the timing where the communication clock 3 keeps the high level. In this case, since it is at the low level, the receiving unit 2 of the clocked serial I/O recognizes "0".

Next, the transmit unit 1 of the clocked serial I/O brings the communication clock 3 to the low level to transfer the third data, and transmits the next data "1". The receiving unit 2 of the clocked serial I/O does not receive the content of communication data 5 even when the communication clock 3 instantaneously changes to the high level, and receives data of the communication data 5 at the timing where the high level is kept. In this case, since it is at the high level, the receiving unit 2 of the clocked serial I/O recognizes "1".

As such, the receiving unit 2 of the clocked serial I/O receives fourth to eight data, and the data "b00110110" is transferred correctly.

Next, an internal configuration and operation of the receiving unit 2 of the clocked serial I/O of the second embodiment of the present invention is described with reference to a block diagram shown in FIG. 14.

Figure 14:
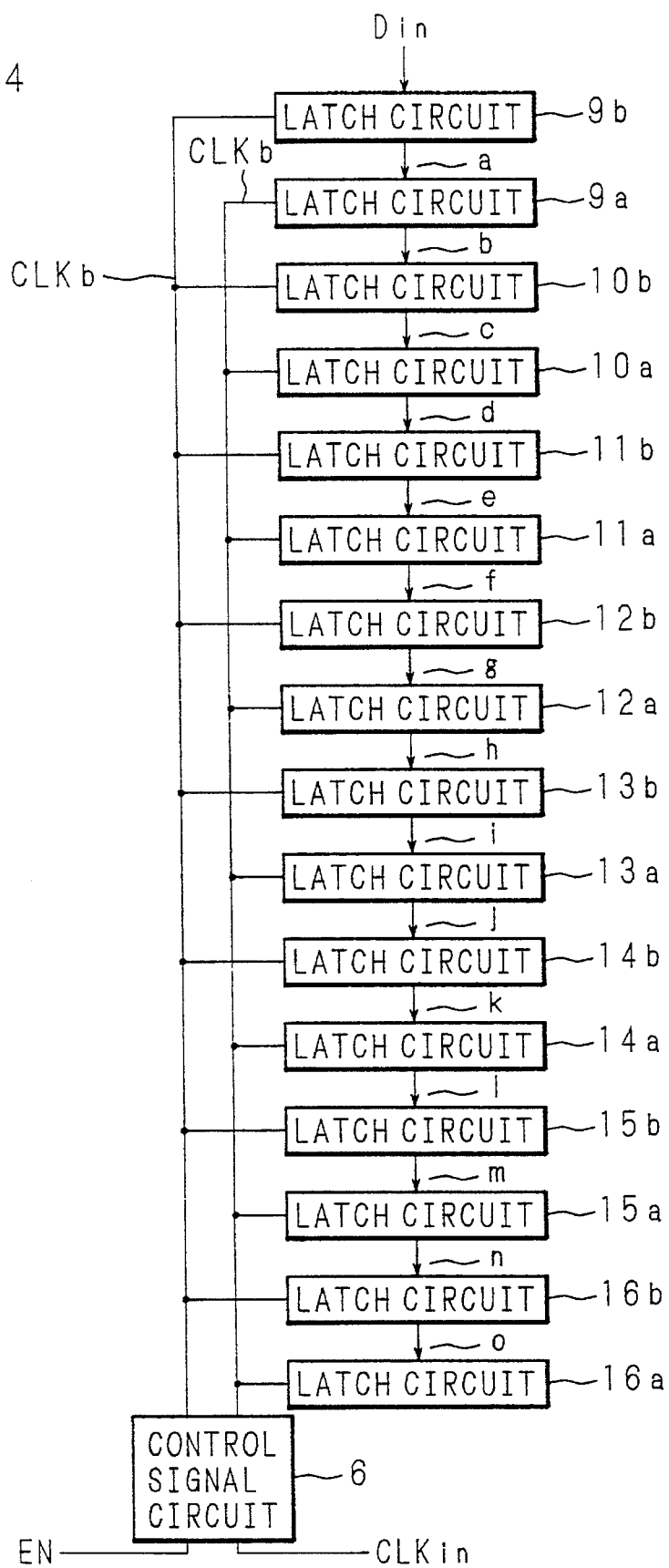
FIG. 14 is a block diagram showing an example of configuration of a receiving unit of a second invention.

In FIG. 14, numeral 6 designates a control signal circuit, which judges whether the same potential has continued in the clock CLKin or not, and outputs the result to two control signals which are in a complementary relation. An internal configuration of the control signal circuit 6 is to be described later.

Numerals 9a to 16a and 9b to 16b designate latch circuits which change outputs responsive to control signals outputted from the control signal circuit 6. Where, the latch circuits 9a to 16a are operated by the control signal which outputs the high level when an input to the control signal circuit 6 has kept the high level, and the latch circuits 9b to 16b are operated by the control signal which outputs the high level when the input to the control signal circuit 6 has kept the low level.

The latch circuits are interconnected as follows; communication data 5 is inputted as an input Din of the latch circuit 9b, an output of the latch circuit 9b is inputted to the latch circuit 9a, an output of the latch circuit 9a is inputted to the latch circuit 10b, an output of the latch circuit 10b, an output of the latch circuit 10b is inputted to the latch circuit 10a, an output of the latch circuit 10a is inputted to the latch circuit 11b, an output of the latch circuit 11b is inputted to the latch circuit 11a, an output of the latch circuit 11a is inputted to the latch circuit 12b, an output of the latch circuit 12b is inputted to the latch circuit 12a, an output of the the latch circuit 12a is inputted to the latch circuit 13b, an output of the latch circuit 13b is inputted to the latch circuit 13a, an output of the latch circuit 13a is inputted to the latch circuit 14b, an output of the latch circuit 14b is inputted to the latch circuit 14a, an output of the latch circuit 14a is inputted to the latch circuit 15b, an output of the latch circuit 15b is inputted to the latch circuit 15a, an output of the latch circuit 15a is inputted to the latch circuit 16b and an output of the latch circuit 16b is inputted to the latch circuit 16a.

Next, though the operation of a receiving unit 2 of a clocked serial I/O shown in FIG. 14 is described with reference to a timing chart shown in FIG. 15, for the convenience' sake of description, the signals are coded so that FIG. 14 and FIG. 15 correspond with each other.

Outputs of the control signal circuit 6 are respectively designated CLKa and CLKb, the input of the latch circuit 9a is designated a, an input of the latch circuit 10b is designated b, an input of the latch circuit 10a is designated c, an input of the latch circuit 11b is designated d, an input of the latch circuit 11a is designated e, an input of the latch circuit 12b is designated f, an input of the latch circuit 12a is designated g, an input of the latch circuit 13b is designated h, an input of the latch circuit 13a is designated i, an input of the latch circuit 14b is designated j, an input of the latch circuit 14a is designated k, an input of the latch circuit 15b is designated l, an input of the latch circuit 15a is designated m, an input of the latch circuit 16b is designated n and an input of the latch circuit 16a is designated o.

Since occurrence of noises in the communication clock 3 is different between the time point outputted from the transmit unit 1 of the clocked serial I/O, and the time pint inputted to the receiving unit 2 of the clocked serial I/O, communication clock 3 seen at the receiving unit 2 of the clocked serial I/O is designated CLKin to distinguish the difference.

Next, the operation of the configuration shown in FIG. 14 is described using the same data "b00110110" as the case of the description of FIG. 12.

At first, contents of all of the latch circuits 91 to 16a and 9b to 16b are "X" (the state of either "1" or "0").

Figure 15:
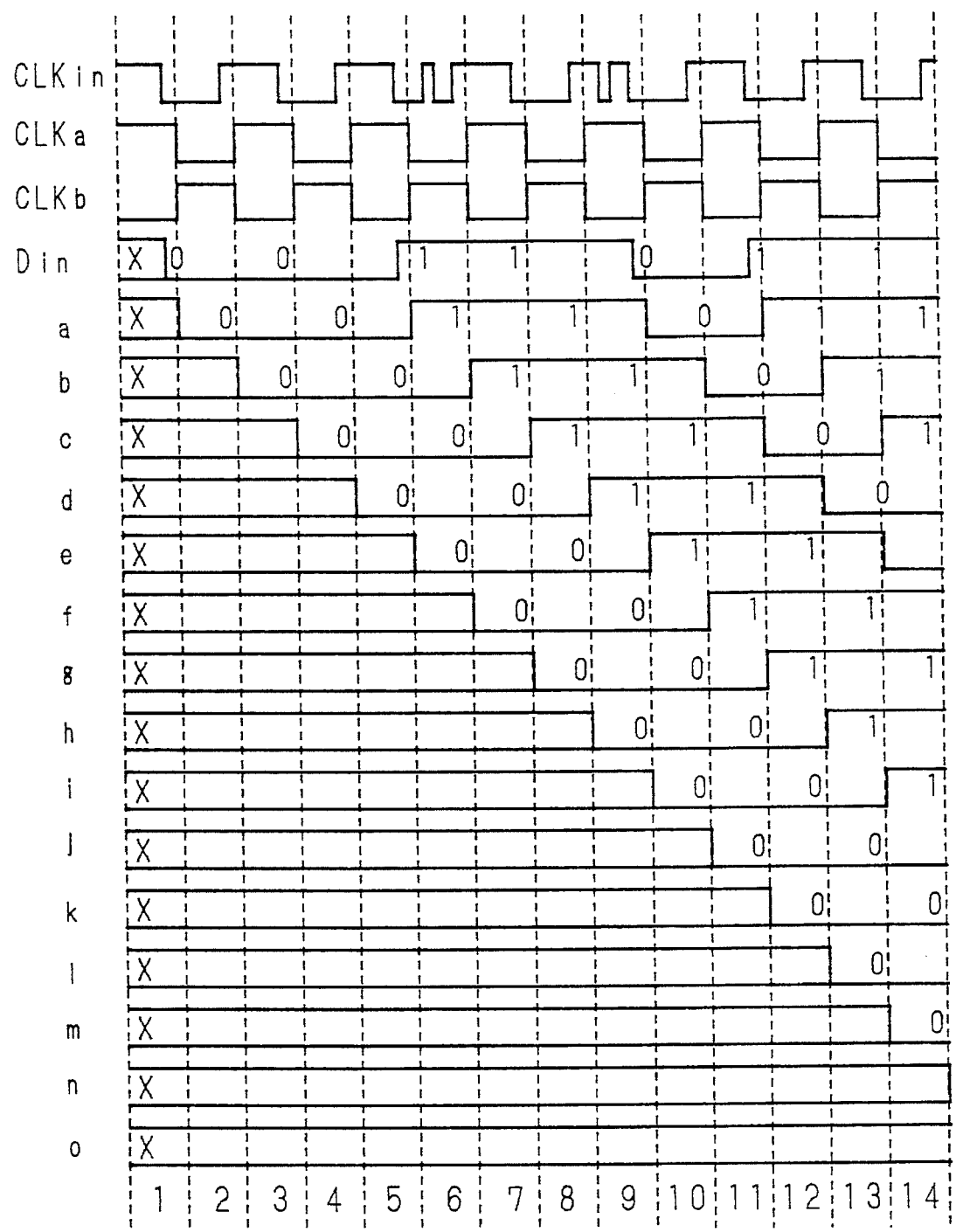
FIG. 15 is a timing chart showing an example of operation of a receiving unit of FIG. 14.

This state is shown in a first cycle in FIG. 15.

Next, when the communication clock 3 changes from the high level to the low level, the CLKin transits from the high level to the low level, judging that this level has continued, the control signal circuit 6 changes the CLKa to invalid from valid and the CLKb to valid from invalid. Thereby, the latch circuits 9a to 16a latch the inputs respectively and the latch circuits 9b to 16b transmit the inputs to the outputs respectively.

This state is shown in a second cycle in FIG. 15.

Inputs to the latch circuits are that, Din is "0", a is "0", b is "X", c is "X", d is "X", e is "X", f is "X", g is "X", h is "X", i is "X", j is "X", k is "X", l is "X", m is "X", n is "X" and o is "X".

Next, when the communication clock 3 changes to the high level from the low level, the CLKin transits to the high level from the low level, judging that this state has continued, the control signal circuit 6 change the CLKb to invalid from valid and the CLKa to valid from invalid.

Thereby, the latch circuits 9b to 16b latch the inputs respectively, and the latch circuits 9a to 16a transmit the inputs to the outputs respectively.

This state is shown in a third cycle in FIG. 15.

Inputs of the latch circuits are that, Din is "0", a is "0", b is "0", c is "X", d is "X", e is "X", f is "X", g is "X", h is "X", i is "X", j is "X", k is "X", l is "X", m is "X", n is "X" and o is "X".

Next, when the communication clock 3 changes to the low level from the high level, the CLKin transits to the low level from the high level, judging that this level has continued, the control signal circuit 6 changes the CLKa to invalid from valid and the CLKb to valid from invalid. Thereby, the latch circuits 9a to 16a latch the inputs respectively, and the latch circuits 9b to 16b transmit the inputs to the outputs respectively.

This state is shown in a fourth cycle in FIG. 15.

Inputs of the latch circuits are that, Din is "0", a is "0", b is "0", c is "0", d is "X", e is "X", f is "X", g is "X", h is "X", i is "X", j is "X", k is "X", l is "X", m is "X", n is "X" and o is "X".

As such, data are shifted between the latch circuits as slightly delaying with respect to edges of the clock CLKin.

Next, the case where the noises occur in the communication clock 3 is described. This state is shown in a sixth and a ninth cycles in FIG. 15.

In the case of sixth cycle, since the noises occur while the communication clock 3 is at the low level, and though the CLKin instantaneously becomes high level but not keeps the high level, the CLKa keeps the low level and the CLKb keeps the high level as it is. And hence, data are not shifted. As such, finally, the data received by the receiving unit 2 of the clocked serial I/O is "b00110110", and the correct data can be transmitted and received.

Next, an example of control signal circuit 6 is described with reference to the block diagram shown in FIG. 10 and a timing chart shown in FIG. 16.

In FIG. 10, numeral 17 designates an inverter element which inverts the clock CLKin which is the input signal to the control signal circuit 6, numeral 18 designates a delay element consisting of a plurality of inverter elements for delaying the clock CLKin, and numeral 23 designates an inverter element connected to an output of the delay element 18.

Numeral 24 designates a composite gate which obtains an OR logic of an AND logic of the clock CLKin and input of the delay element 18 and the other input, and numeral 25 designates a composite gate which obtains an OR logic of an AND logic of the outputs of the inverter element 17 and the inverter element 23, an output of the composite gate 24 and an enable signal. The output of the composite gate 25 is connected to another input of the composite gate 24.

Numeral 22 designates an inverter element which inverts the output of the composite gate 25.

In FIG. 10, the input signal to the control signal circuit 6 is designated a, the output of the inverter element 17 is designated b, the output of the delay element 18 is designated c, the output of the inverter element 23 is designated d, the output of the composite gate 24 is designated e, the output of the composite gate 25 is designated f, the output of the inverter element 22 is designated g and the enable signal is designated h.

Next, the operation of the control signal circuit 6 shown in FIG. 10 is described.

When the output e of the composite gate 24 is at the low level, either both the output c of the delay element 18 and the input signal a to the control signal circuit 6 are at the high level (a first state), or the output f of the composite gate 25 is at the high level (a second state). When the output f of the composite gate 25 is at the low level, either both the output d of the inverter element 23 and the output b of the inverter element 17 are at the high level (a third state), or the output e of the composite gate 24 is at the high level (a fourth state), or the enable signal f is at the high level (a reset state).

Assuming the above-mentioned fact, when the input signal a to the control signal circuit 6 is at the high level, the output b of the inverter element 17 changes to the low level, the output c of the delay element 18 changes to the high level and the output d of the inverter element 23 changes to the low level. That is, since the input signal a to the control signal circuit 6 as well as the output c of the delay element 18 are at the high level, the abovementioned first state is attached, thus the output e of the composite gate 24 changes to the low level. Meanwhile, since the output d of the inverter element 23, the output b of the inverter element 17 and the enable signal f are at the low level, the output f of the composite gate 25 changes to the high level, and the output g of the inverter element 22 changes to the low level.

Figure 16:
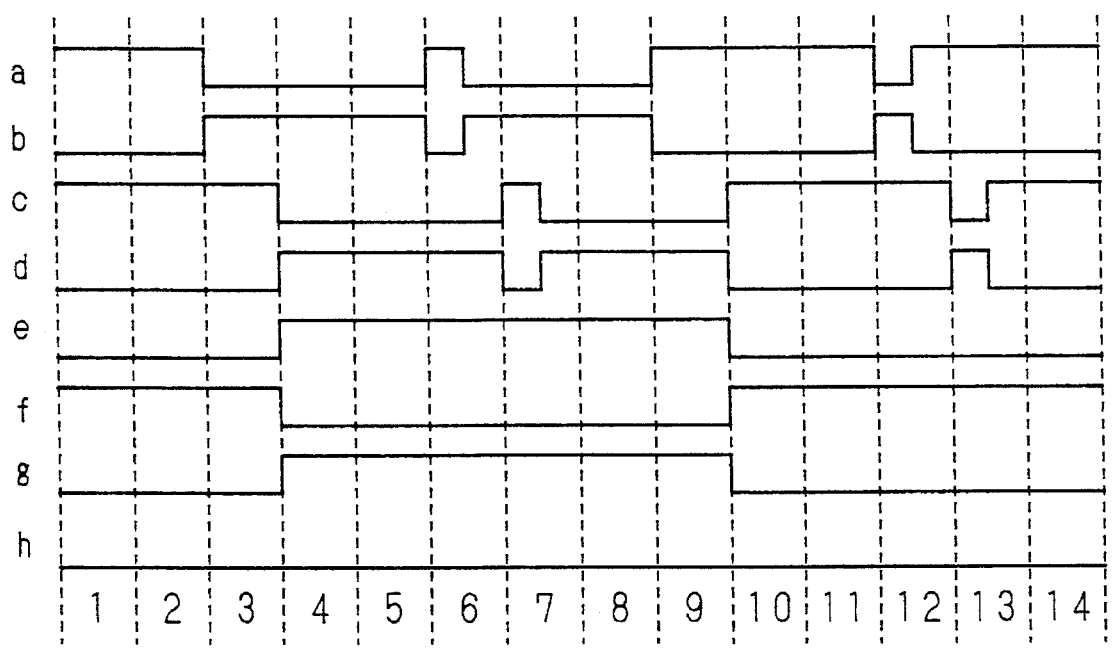
FIG. 16 is a timing chart showing an example of operation of a control signal circuit of a receiving unit shown in FIG. 10, FIG. 17 block diagram showing an example of configuration of a receiving unit of a third invention.

This state is shown in first and second cycles in FIG. 16.

Next, though the output b of the inverter element 17 transits to the high level when the input signal a to the control signal circuit 6 transits to the low level, the output c of the delay element 18 is still at the high level because the input change is not yet transmitted, and also the output d of the inverter element 23 is at the low level because the input change is not yet transmitted. Thus, the composite gate 24 and composite gate 25 keep the existing values, and the output f of the composite gate 25 is still at the high level and the output g of the inverter element 22 is still at the low level.

This state is shown in a third cycle in FIG. 16.

Next, when the input signal a to the control signal circuit 6 keeps the low level, the output c of the delay element 18 and the output d of the inverter element 23 change to the low level and the high level respectively. Thereby, the aforementioned third state is attained, and the output f of the composite gate 25 changes to the low level and the output e of the composite gate 24 changes to the high level. Thus, the output g of the inverter element 22 transits to the high level.

This state is shown in fourth and fifth cycles in FIG. 16.

Next, when the input signal a to the control signal circuit 6 returns to the low level immediately after changing once to the high level, the output b of the inverter element 17 returns to the high level after changing to the low level instantaneously. However, since the input change is not transmitted, the output c of the delay element 18 and the output d of the inverter element 23 both retain the previous values. Thus, the output f of the composite gate 25 does not change, and also the output g of the inverter element 22 does not change.

This state is shown in a sixth cycle in FIG. 16.

Next, the input change is transmitted to the delay element 18 and the inverter element 23, and the output c of the delay element 18 changes to the high level instantaneously, and the output d of the inverter element 23 changes to the low level instantaneously and return to the original state. However, since the input signal a to the control signal circuit 6 and the output b of the inverter element 17 are respectively at the low level and the high level, the outputs of the composite gates 24 and 25 are not in the state to be changed. And hence, the output f of the composite gate 25 is kept at the low level, and the output g of the inverter element 22 is kept at the high level.

This state is shown in a seventh cycle in FIG. 16.

Hereinafter, the same operation results are shown in a ninth cycle to fourteenth cycle in FIG. 16.

As such, the control signal circuit 6, whose outputs are not affected by the short time change of the clock CLKin, is obtained.

Embodiment 3

Next, an internal configuration and operation of a receiving unit 2 of a third embodiment of a clocked serial I/O of the present invention is described with reference to FIG. 17.

Figure 17:
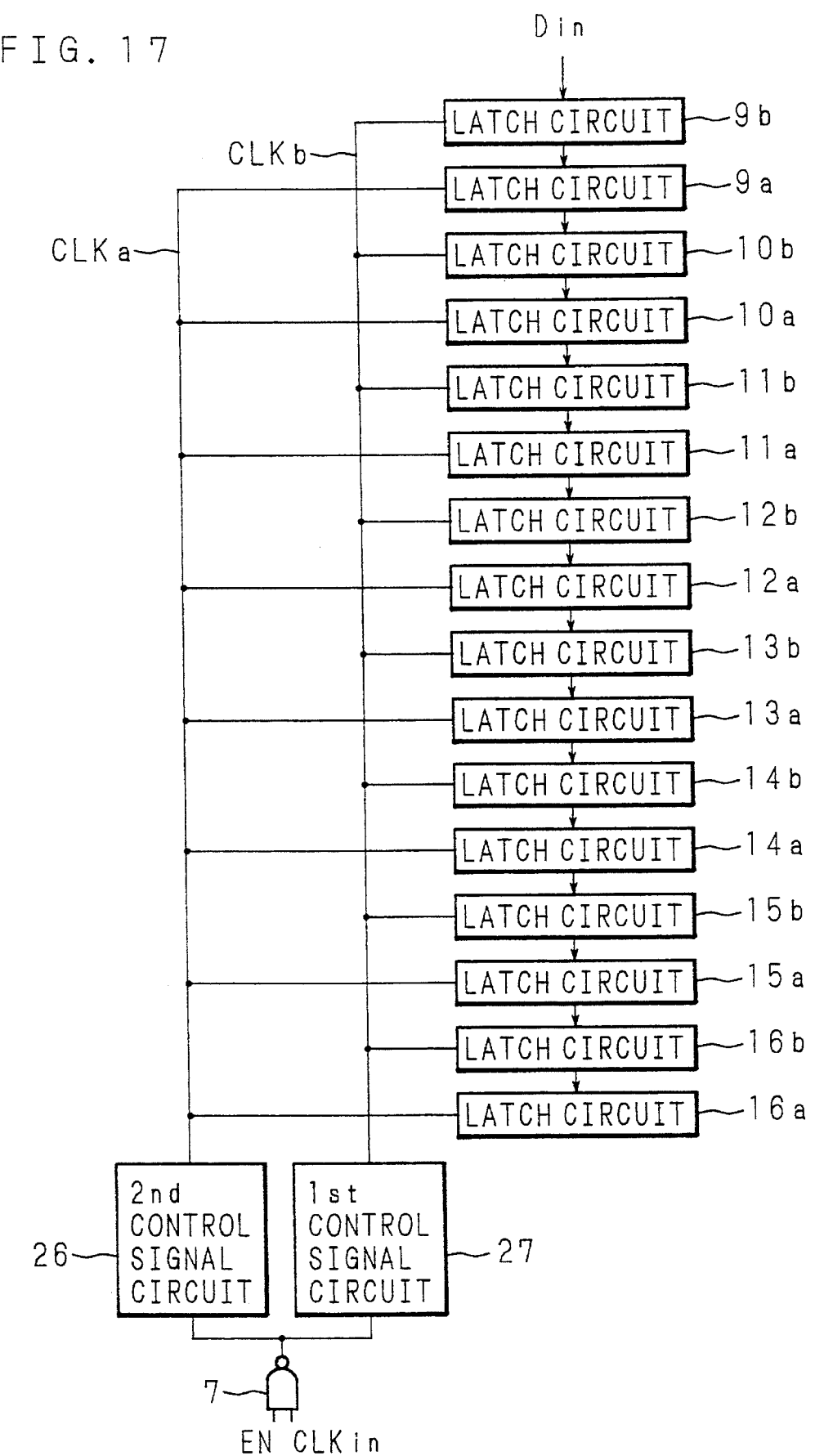

In FIG. 17, numeral 27 designates a first control signal circuit. The first control signal circuit 27, though its internal configuration is to be described later, is constituted such that, a time at which the output changes to valid from invalid by transition of the clock CLKin, which is the input signal, to the low level from the high level, is after than a time at which the output changes to invalid from valid by transition of the clock CLKin to the low level from the high level.

Numeral 26 designates a second control signal circuit. The second control signal circuit 26, though its internal configuration is to be described later, is constituted such that, a time at which the output changes to valid from invalid by transition of the clock CLKin, which is the input signal, to the high level from the low lever, is after than a time at which the output changes invalid from valid by transition of the clock CLKin to the low level from the high level.

Numerals 9a to 16a and 9b to 16b designate latch circuits which change the outputs responsive to control signals outputted from the control signal circuits 26 and 27. Where, the latch circuits 9a to 16a are operated by the control signal outputted from the second control signal circuit 26 and the latch circuits 9b to 16b are operated by the control signal outputted from the first control signal circuit 27.

These latch circuits are interconnected as follows; communication data 5 is inputted to the latch circuit 9b as an input Din, an output of the latch circuit 9b is inputted to the latch circuit 9a, an output of the latch circuit 9a is inputted to the latch circuit 10b, an output of the latch circuit 10b is inputted to the latch circuit 10a, an output of the latch circuit 10a is inputted to the latch circuit 11b, an output of the latch circuit 11b is inputted to the latch circuit 11a, an output of the latch circuit 11a is inputted to the latch circuit 12b, an output of the latch circuit 12b is inputted to the latch circuit 12a, an output of the latch circuit 12a is inputted to the latch circuit 13b, an output of the latch circuit 13b is inputted to the latch circuit 13a, an output of the latch circuit 13a is inputted to the latch circuit 14b, an output of the latch circuit 14b is inputted to the latch circuit 14a, an output of the latch circuit 14a is inputted to the latch circuit 15b, an output of the latch circuit 15b is inputted to the latch circuit 15a, an output of the latch circuit 15a is inputted to the latch circuit 16b and an output of the latch circuit 16b inputted to the latch circuit 16a.

Next, though the operation of the receiving unit 2 of the clocked serial I/O shown in FIG. 17 is described with reference to a timing chart shown in FIG. 18, for the convenience' sake of description, the signals are coded so that FIG. 17 and FIG. 18 correspond with each other.

Output of the first and second control signal circuits 27, 26 are respectively designated CLKa and CLKb, an input of the latch circuit 9a is designated a, an input of the latch circuit 10b is designated b, an input of the latch circuit 10a is designated c, an input of the latch circuit 11b is designated d, an input of the latch circuit 11a is designated e, an input of the latch circuit 12b is designated f, an input of the latch circuit 12a is designated g, an input of the latch circuit 13b is designated h, an input of the latch circuit 13a is designated i, an input of the latch circuit 14b is designated j, an input of the latch circuit 14a is designated k, an input of the latch circuit 15b is designated l, an input of the latch circuit 15a is designated m, an input of the latch circuit 16b is designated n and an input of the latch circuit 16a is designated o.

Since the occurrence of noises in the communication clock 3 is different between the time point outputted from the transmit unit 1 of the clocked serial I/O, and the time point inputted to the receiving unit 2 of the clocked serial I/O, the communication clock 3 seen at the receiving unit 2 of the clocked serial I/O is designated CLKin to distinguish the difference.

Next, the operation of the configuration shown in FIG. 17 is described using the same data "b00110110" as the case of the description of FIG. 12.

At first, contents of all of the latch circuits 9a to 16a and 9b to 16b are "X" (the state of either "1" or "0").

Figure 18:
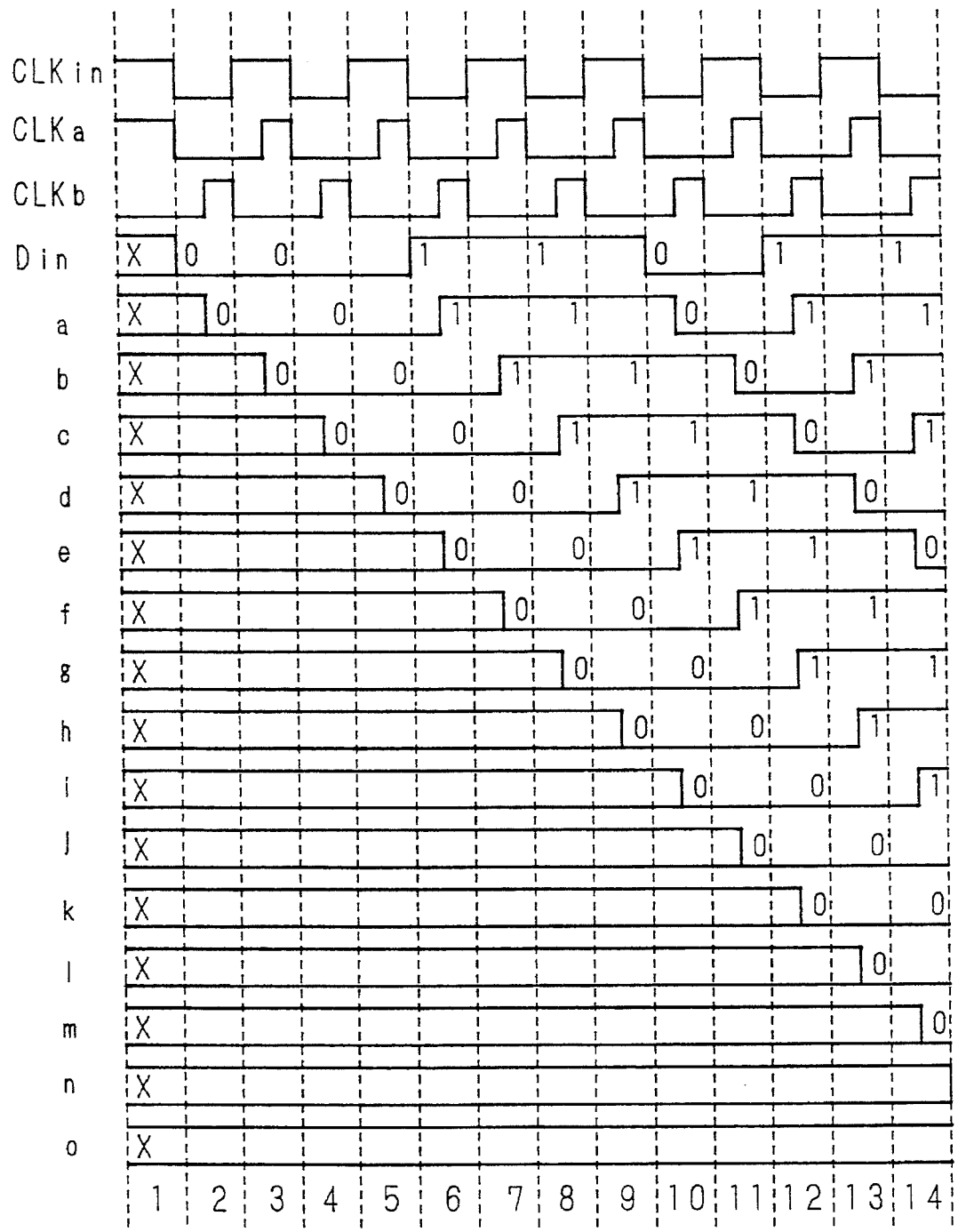
FIG. 18 is a timing chart showing an example of operation of a receiving unit of FIG. 14.

This state is shown in a first cycle in FIG. 18.

Next, when the communication clock 3 changes to the low level from the high level, the CLKin transits to the low level from the high level, judging that this level has continued, the second control signal circuit 26 changes the CLKa to invalid from valid, and the first control signal circuit 27 changes the CLKb to valid from invalid. Thereby, the latch circuits 9a to 16a latch the inputs respectively, and the latch circuits 9b to 16b transmit the inputs to the outputs respectively.

This state is shown in a second cycle in FIG. 15.

Inputs to the latch circuits are that; Din is "0", a is "0", b is "X", c is "X", d is "X", e is "X", f is "X", g is "X", h is "X", i is "X", j is "X", k is "X", l is "X", m is "X", n is "X" and o is "X".

Next, when the communication clock 3 changes to the high level from the low level, the CLKin transits to the high level from the low level, judging that this level has continued, the first control signal circuit 27 changes the CLKb to invalid from valid, and the second control signal circuit 26 changes the CLKa to valid from invalid. Thereby, the latch circuits 9b to 16b latch the inputs respectively, and the latch circuits 9a to 16a transmit the inputs to the outputs respectively.

This state is shown in a third cycle in FIG. 18.

Inputs to the latch circuits are that; Din is "0", a is "0", b is "0", c is "X", d is "X", e is "X", f is "X", g is "X", h is "X", i is "X", j is "X", k is "X", l is "X", m is "X", n is "X" and o is "X".

When the communication clock 3 changes to the low level from the high level next, the CLKin transits to the low level from the high level, judging that this level has continued, the second control signal circuit 26 changes the CLKa to invalid from valid, and the first control signal circuit 27 changes the CLKb to valid from invalid. Thereby, the latch circuits 9a to 16a latch the inputs respectively, and the latch circuits 9b to 16b transmit the inputs to the outputs respectively.

This state is shown in a fourth cycle in FIG. 15.

Inputs to the latch circuits are that; Din is "0", a is "0", b is "0", c is "0", d is "X", e is "X", f is "X", g is "X", h is "X", i is "X", j is "X", k is "X", l is "X", m is "X", n is "X" and o is "X".

As such, data are shifted between the latch circuits as slightly delaying with respect to edges of the clock CLKin.

Hereupon, the different effect of the third embodiment from the second embodiment is that, since the latch circuit 9b samples information of the communication data 5 by the edge of the communication clock 3, the data setup and hold are restricted by the clock edge to facilitate the system design.

Next, the configurations of the control signal circuits 26, 27 are to be shown specifically and described how they respond to the noises.

Figure 19:
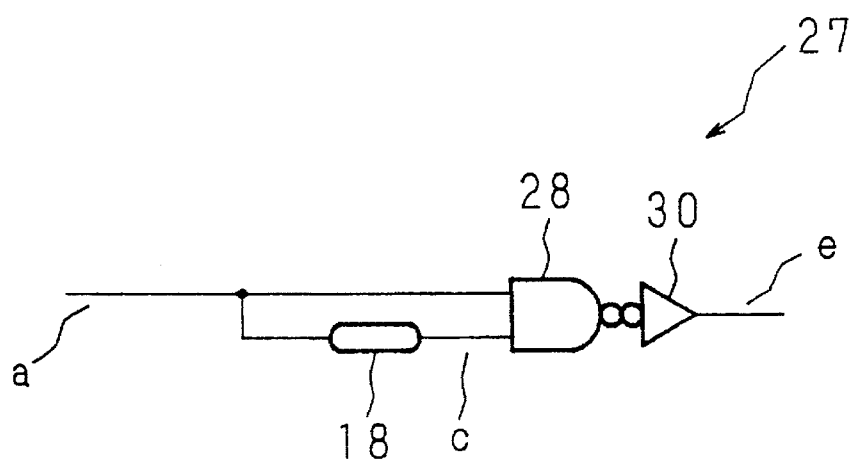
FIG. 19 is a circuit diagram showing showing an example of logical configuration of a control signal circuit of a receiving unit of a third invention.

FIG. 19 an example of specific configuration of the first control signal circuit 27.

In FIG. 19, numeral 18 designates a delay element for delaying the clock CLKin which is the input signal to the first control signal circuit 27, numeral 28 designates a NAND gate which obtains an AND logic of an output of the delay element 18 and the clock CLKin, and numeral 30 designates an inverter element which inverts an output of the NAND gate 28.

In FIG. 19, the input signal to the first control circuit 27 is designated a, the output of the delay element 18 is designated c, and an output of the inverter element 30 is designated e.

Figure 20:
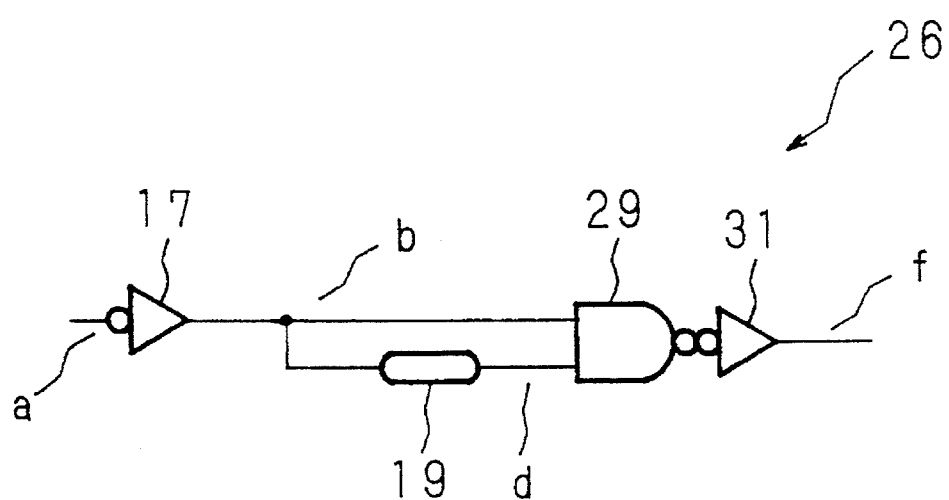
FIG. 20 is a circuit diagram showing an another example of logical configuration of a control signal circuit of a receiving unit of a third invention.

FIG. 20 shows an example of the second control signal circuit 26.

In FIG. 20, numeral 17 designates an inverter element which inverts the clock CLKin which is the input signal to the second control signal circuit 26, numeral 19 designates a delay element for delaying the clock CLKin, numeral 29 designates a NAND gate which obtains an AND logic of an output of the delay element 19 and an output of the inverter element 17, and numeral 31 designates an inverter element which inverts an output of the NAND gate 29.

In FIG. 20, the input signal to the second control signal circuit 26 is designated a, the output of the inverter element 17 is designated b, the output of the delay element 19 is designated d and an output of the inverter element 30 is designated f.

Next, the operation of the control signal circuits 26 and 27 is described with reference to a timing chart shown in FIG. 21.

Since the output c of the delay element 18 is at the high level when the input signal a is at the high level, the output e of the inverter element 30 is at the high level. Since the output of the inverter element 17 and the output d of the delay element 19 are at the low level, the output f of the inverter element 31 is at the low level.

Figure 21:
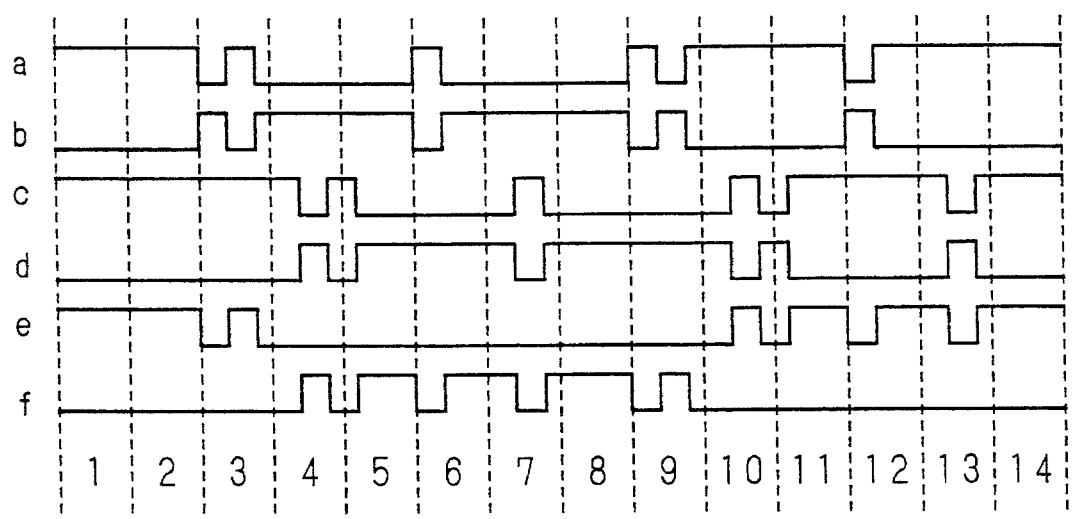
FIG. 21 is a timing chart showing an example of operation of a control signal circuits of FIG. 19 and FIG. 20.

This state is shown in first and second cycles in FIG. 21.

Next, when the input signal a changes to the low level from the high level, and stabilizes at the low level after becoming low level from the high level instantaneously by ringing or something, since the delay element 18 is not affected by the transition of the input signal a and its output c is at the high level as it is, waveform of the input signal a is transmitted to the inverter element 30 intact. And hence, the output e of the inverter element 30 returns to the high level immediately after changing once to the low level from the high level, and immediately stabilizes at the low level.

The output f of the inverter element 31 is not affected by the change of output b of the inverter element 17, and since the output d of the delay element 19 does not change and stays at the low level, it keeps the low level.

This state is shown in a third cycle in FIG. 21.

Next, when the delay elements 18 and 19 transmit the change of the input signal a to the outputs even when the output c of the delay element 18 has changed, since the input signal a is at the low level, the output e of the inverter element 30 keeps the low level. However, since the output b of the inverter element 17 is at the high level, the output f of the inverter element 31 is affected by the output d of the delay element 19.

This state is shown in the fourth and fifth cycles in FIG. 21.

Next, when the input signal a is at the low level and returns to the low level after becoming high level instantaneously by the noise or something, since the output c of the delay element 18 is not affected by the transition of the input signal a and stays at the low level, the output e of the inverter element 30 is at the low level independent of the input signal a. However, since the output d of the delay element 19 stays at the high level, the output f of the inverter element 31 is directly affected by the output b of the inverter element 17 and outputted, and returns to the high level after dropping instantaneously to the low level.

This state is shown in a sixth cycle in FIG. 21.

Similarly, when the input signal a transits to the high level from the low level, the state is as shown in the ninth to eleventh cycles in FIG. 21. When the input signal a is at the high level and returns to the high level after becoming low level instantaneously, the state is as shown in the twelfth and thirteenth cycles in FIG. 21.

As it is apparent from the timing chart shown in FIG. 21, though the outputs of the control signal circuits 26 and 27 are affected by the noises in the clock CLKin, only the signal, whose output is valid, swings to the invalid side, but the invalid output never becomes valid. This is because that, as is shown in FIG. 17, since the outputs of the control signal circuits 26 and 26 are interconnected when connecting to the control inputs of the latch circuits, even when the output of one control signal circuit swings to valid or invalid due to the noises, data of latch circuits are not shifted. The data of latch circuits are shifted when the control circuit outputs become valid alternately, and the data of latch circuits are destroyed when both the outputs of the control signal circuit are valid.

Figure 22:
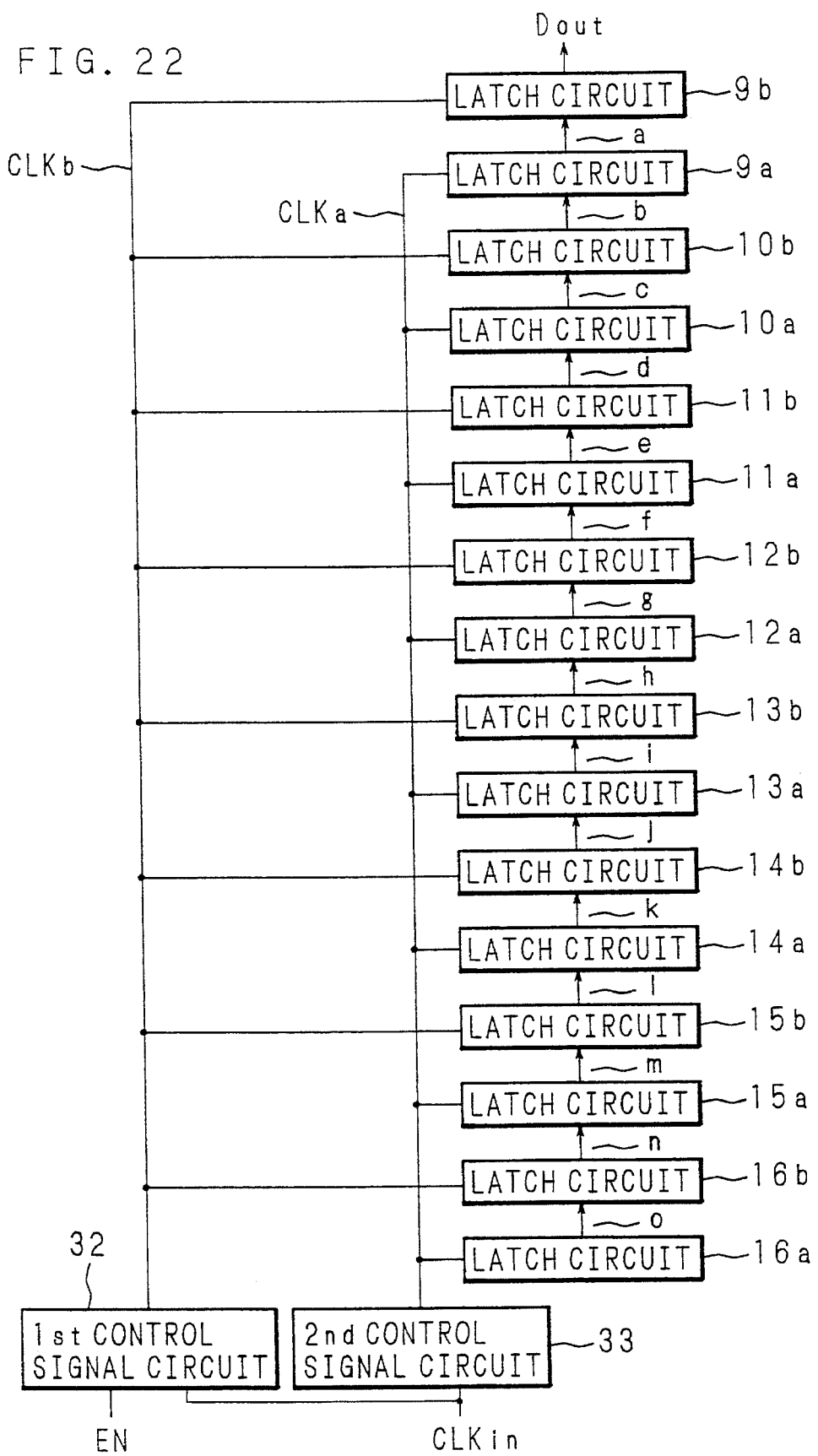
FIG. 22 is a block diagram showing an example of configuration of a transmit unit of a fourth invention.

Next, a transmit unit 1 of the clocked serial I/O of a third embodiment of the present invention is described with reference to a block diagram of FIG. 22 showing its configuration.

In FIG. 22, numeral 32 designates a first control signal circuit. The first control signal circuit 32, through its internal configuration is to be described later, is constituted such that, a time at which the output changes to valid from invalid by transition of the clock CLKin, which is the input signal, to the low level from the high level, is after than a time at which the output changes to invalid from valid by transition of the clock CLKin to the high level from the low level.

Numeral 33 designates a second control signal circuit. The second control signal circuit 33, though its internal configuration is to be described later, is constituted such that, a time at which the output changes to valid from invalid by transition of the clock CLKin, which is the input signal, to the high level from the low level, is after than a time at which the output changes to invalid from valid by transition of the clock into the low level from the high level.

Numerals 9a to 16a and 9b and 16b designate latch circuit, which change the outputs responsive to control signals outputted from the control signal circuits 32 and 33. Where, the latch circuits 9a to 16a are operated by the output signal outputted from the second control signal circuit 33, and the latch circuits 9b to 16b are operated by the output signal outputted from the first control signal circuit 32.

These latch circuits are interconnected as follows; an output of the latch circuit 16a is inputted to the latch circuit 16b, an output of the latch circuit 16b is inputted to the latch circuit 15a, an output of the latch circuit 15a is inputted to the latch circuit 15b, an output of the latch circuit 15b is inputted to the latch circuit 14a, an input of the latch circuit 14a is inputted to the latch circuit 14b, an output of the latch circuit 14b is inputted to the latch circuit 13a, an output of the latch circuit 13a is inputted to the latch circuit 13b, an output of the latch circuit 13b is inputted to the latch circuit 12a, an output of the latch circuit 12a is inputted to the latch circuit 12b, an output of the latch circuit 12b is inputted to the latch circuit 11a, an output of the latch circuit 11a is inputted to the latch circuit 11b, an output of the latch circuit 11b is inputted to the latch circuit 10a, an output of the latch circuit 10a is inputted to the latch circuit 10b, an output of the latch circuit 10b is inputted to the latch circuit 9a, and an output of the latch circuit 9a is inputted to the latch circuit 9b. An output Dout of the latch circuit 9b is outputted as communication data 5.

Though the operation of a transmit unit of a clocked serial I/O shown in FIG. 22 is described with reference to a timing chart shown in FIG. 23, for the convenience' sake of description, signals are coded so that FIG. 22 and FIG. 23 correspond with each other.

The output of the second control signal circuit 33 is designated CLKa, the output of the first control signal circuit 32 is designated CLKb, the output of the latch circuit 9a is designated a, the output of the latch circuit 10b is designated b, the output of the latch circuit 10a is designated c, the output of the latch circuit 11b is designated d, the output of the latch circuit 11a is designated e, the output of the latch circuit 12b is designated f, the output of the latch circuit 12a is designated g, the output of the latch circuit 13b is designated h, the output of the latch circuit 13a is designated i, the output of the latch circuit 14b is designated j, the output of the latch circuit 14a is designated k, the output of the latch circuit 15b is designated l, the output of the latch circuit 15a is designated m, the output of the latch circuit 16b is designated n and the output of the latch circuit 16a is designated o.

Since the occurrence of noises in the communication clock 3 is different between the time point outputted from the receiving unit 2 of the clocked serial I/O, and the time point inputted to the transmit unit 1 of the clocked serial I/O, the communication clock 3 seen at the transmit unit 1 of the clocked serial I/O is designated CLKin to distinguish the difference.

Next, the operation of the configuration shown in FIG. 22 is described using the same data "b00110110" as the case of the description of FIG. 12.

At first, data are latched in the latch circuits as follows; "0" is latched in the latch circuit 10b, "0" is latched in the latch circuit 11b, "1" is latched in the latch circuit 12b, "1" is latched in the latch circuit 13b, "0" is latched in the latch circuit 14b, "1" is latched in the latch circuit 15b, "1" is latched in the latch circuit 16b and "0" is latched in the latch circuit 16a.

Since the CLKa is valid and the CLKb is invalid, outputs of the latch circuits are that, a is "0", b is "0", c is "0", d is "0", e is "1", f is "1", g is "1", h is "1", i is "0", j is "0", k is "1", l is "1", m is "1", n is "1" and o is "0".

Figure 23:
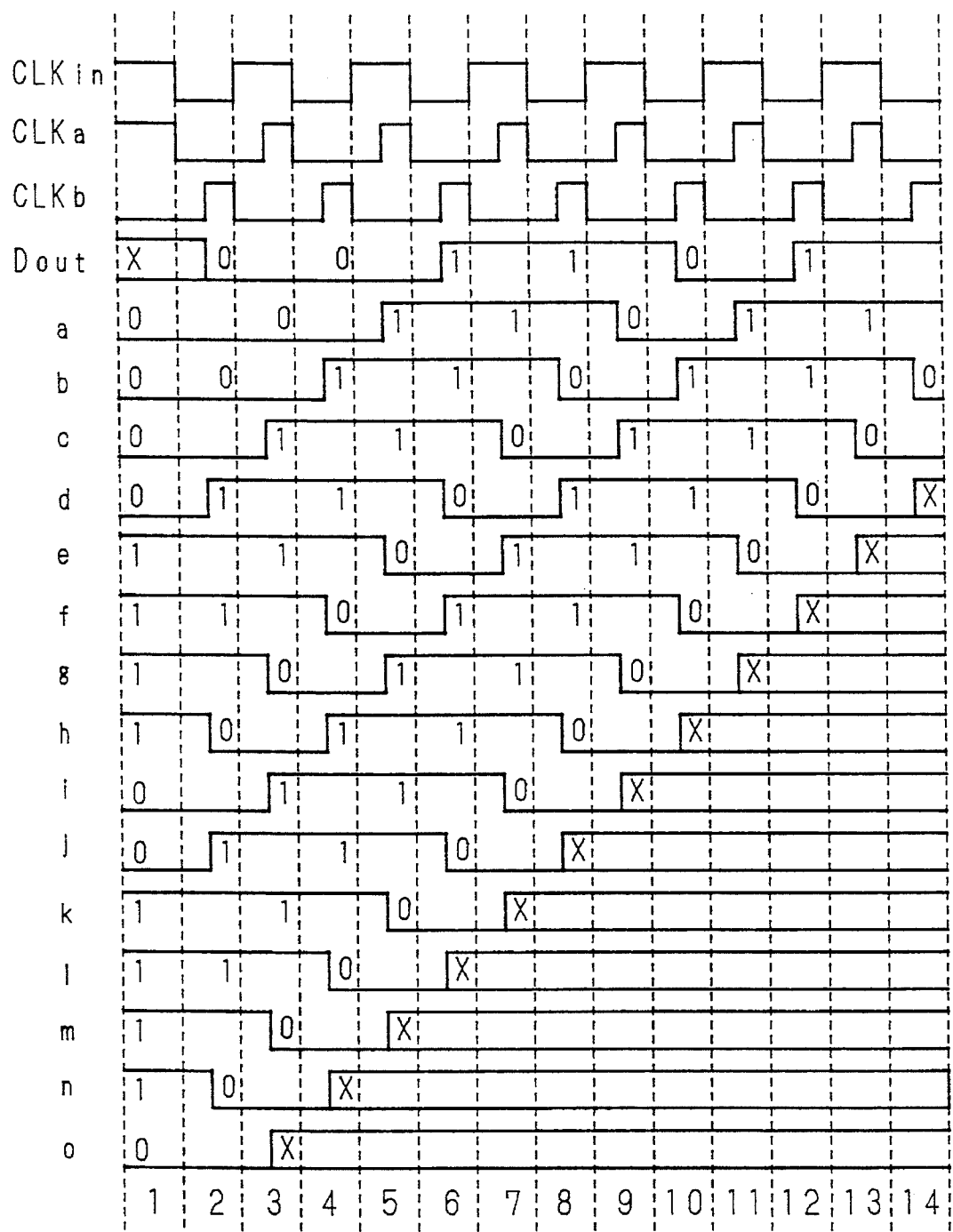
FIG. 23 is a timing chart showing an example of operation of a transmit unit of FIG. 22.

This state is shown in a first cycle in FIG. 23.

Next, when the communication clock 3 changes to the low level from the high level, the CLKin transits to the low level from the high level, judging that this level has continued, the second control signal circuit 33 changes the CLKa to invalid from valid, and the first control signal circuit 32 changes the CLKb to valid from invalid. Thereby, the latch circuits 9a to 16a latch the inputs respectively, and the latch circuits 9b to 16b transmit the inputs to the outputs respectively.

This state is shown in a second cycle in FIG. 23.

outputs of the latch circuits are that; Dout is "0", a is "0", b is "0", c is "0", d is "1", e is "1", f is "1", g is "1", h is "0", i is "0", j is "1", k is "1", l is "1", m is "1", n is "0" and o is "0".

As such, data are shifted between the latch circuits as slightly delaying with respect to edges of the clock CLKin.

Next, a specific configuration of the control signal circuits 32 and 33 are shown to describe how they respond against noises.

Figure 24:
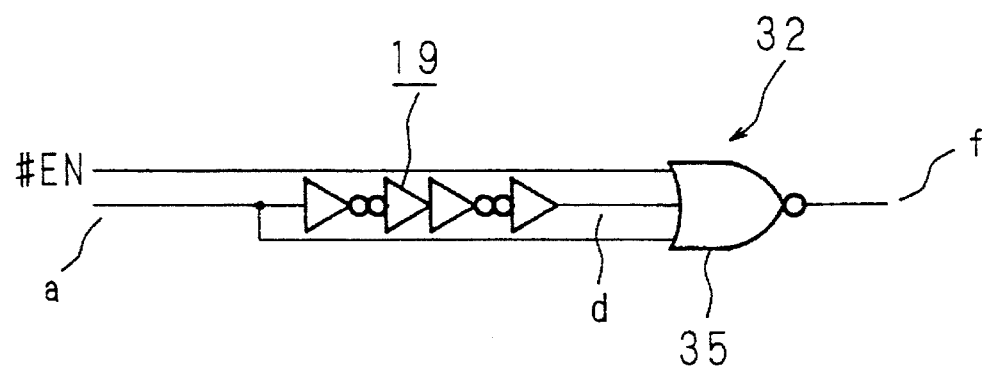
FIG. 24 is a circuit diagram showing an example of logical configuration of a control signal circuit of a transmit unit of a fourth invention.

FIG. 24 shows an example of specific configuration of the first control signal circuit 32.

In FIG. 24, numeral 19 designates a delay element constituted by a plurality of inverter elements for delaying the clock CLKin, which is the input signal to the first control signal circuit 32, and numeral 35 designates a NOR gate which obtains an OR logic of an output of the delay element 19, the clock CLKin and an enable signal.

In FIG. 24, the input signal to the first control signal circuit 32 is designated a, the output of the delay element 19 is designated d, and an output of the NOR gate 35 is designated f.

Figure 25:
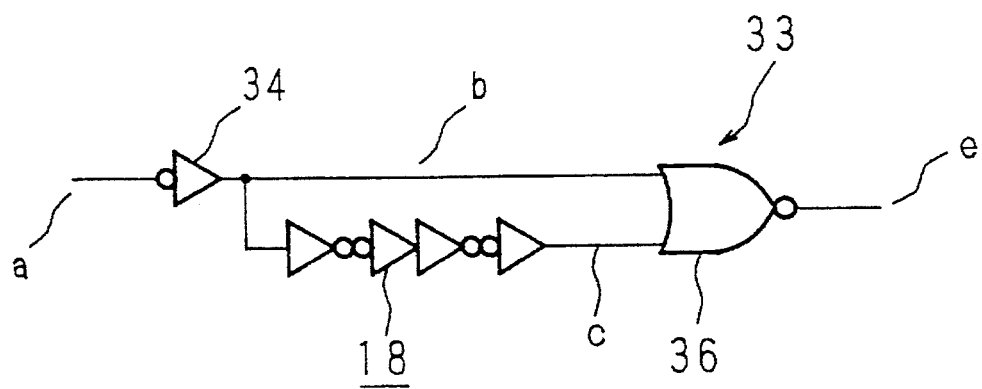
FIG. 25 is a circuit diagram showing an another example of logical configuration of a control signal circuit of a transmit unit of a fourth invention.

FIG. 25 shows an example of specific configuration of the second control signal circuit 33.

In FIG. 25, numeral 34 designates an inverter element which inverts the clock CLKin, which is the input signal to the second control signal circuit 33, numeral 18 designates an delay element consisting of a plurality of inverter elements for delaying the lock CLKin, and numeral 36 designates a NOR gate which obtains an OR logic of an output of the inverter element 34 and an output of the delay element 18.

In FIG. 25, an input signal to the second control signal circuit 33 is designated a, the output of the inverter element 34 is designated b, the output of the delay element 18 is designated c and an output of the NOR gate 36 is designated e.

Next, the operation of the control signal circuits 32 and 33 is described with reference to a timing chart shown in FIG. 26.

The enable signal is at the low level. Since the output d of the delay element 19 is at the high level when the input signal a is at the high level, the output f of the NOR gate 35 is at the low level. Since the output b of the inverter element 34 is at the low level and the output c of the delay element 18 is at the low level, the output e of the NOR gate 36 is at the high level.

Figure 26:
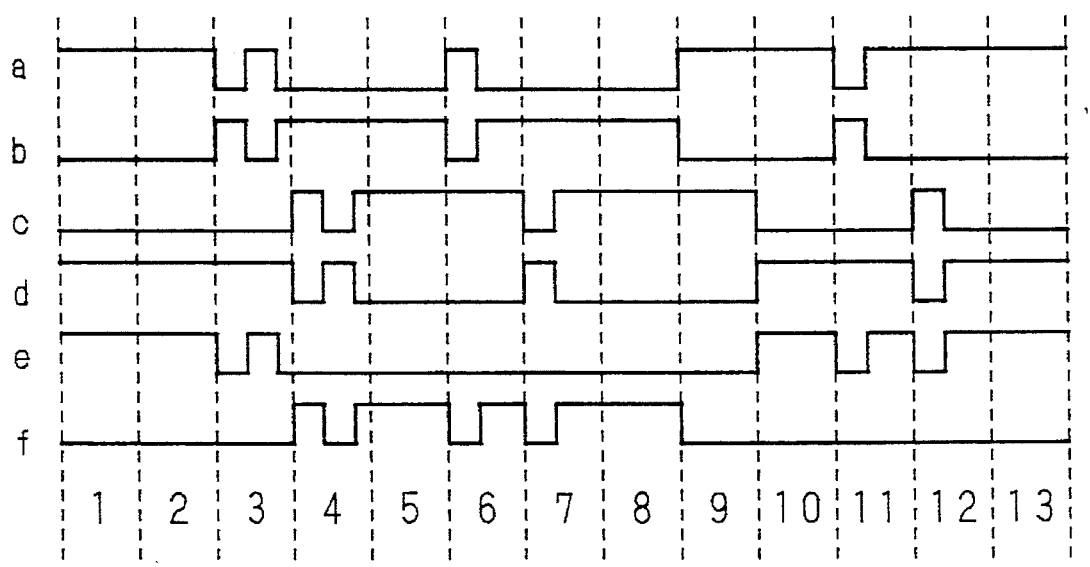
FIG. 26 is a timing chart showing an example of operation of control signal circuits of FIG. 24 and FIG. 25.

This state is shown in first and second cycles in FIG. 26.

Next, when the input signal a changes to the low level from the high level, and stabilizes at the low level after becoming high level from the low level instantaneously by ringing or something, since the delay element 18 is not affected by the transition of the input signal a and its output c keeps the low level as it is, waveform of the input signal a are transmitted to the NOR gate 36 intact. And hence, the output e of the NOR gate 36 returns to the high level immediately after becoming once to the low level from the high level, and immediately stabilizes at the low level. The output f of the NOR gate 35 is affected by the input signal a, and since the output d of the delay element 19 does not change and stays at the high level, it keeps the low level.

This state is shown in a third cycle in FIG. 26.

Next, when the delay elements 18 and 19 transmit the change of the input signal a to the outputs, even when the output c of the delay element 18 has changed, since the inverter element 34 is at the high level, the output e of the NOR gate 36 keeps the low level. However, since the input signal a is at the low level, the output f of the NOR gate 35 is affected by the output d of the delay element 19.

This state is shown in fourth and fifth cycles in FIG. 26.

Similarly, even when there is the noises in the input signal a, the state is as shown in the fifth to thirteenth cycles in FIG. 26, and the result is same as the receiving unit 2 of the clocked serial I/O.

Embodiment 4

Next, a fourth embodiment of the present invention is described with reference to a block diagram of a transmit unit of a clocked serial I/O shown in FIG. 27.

Figure 27:
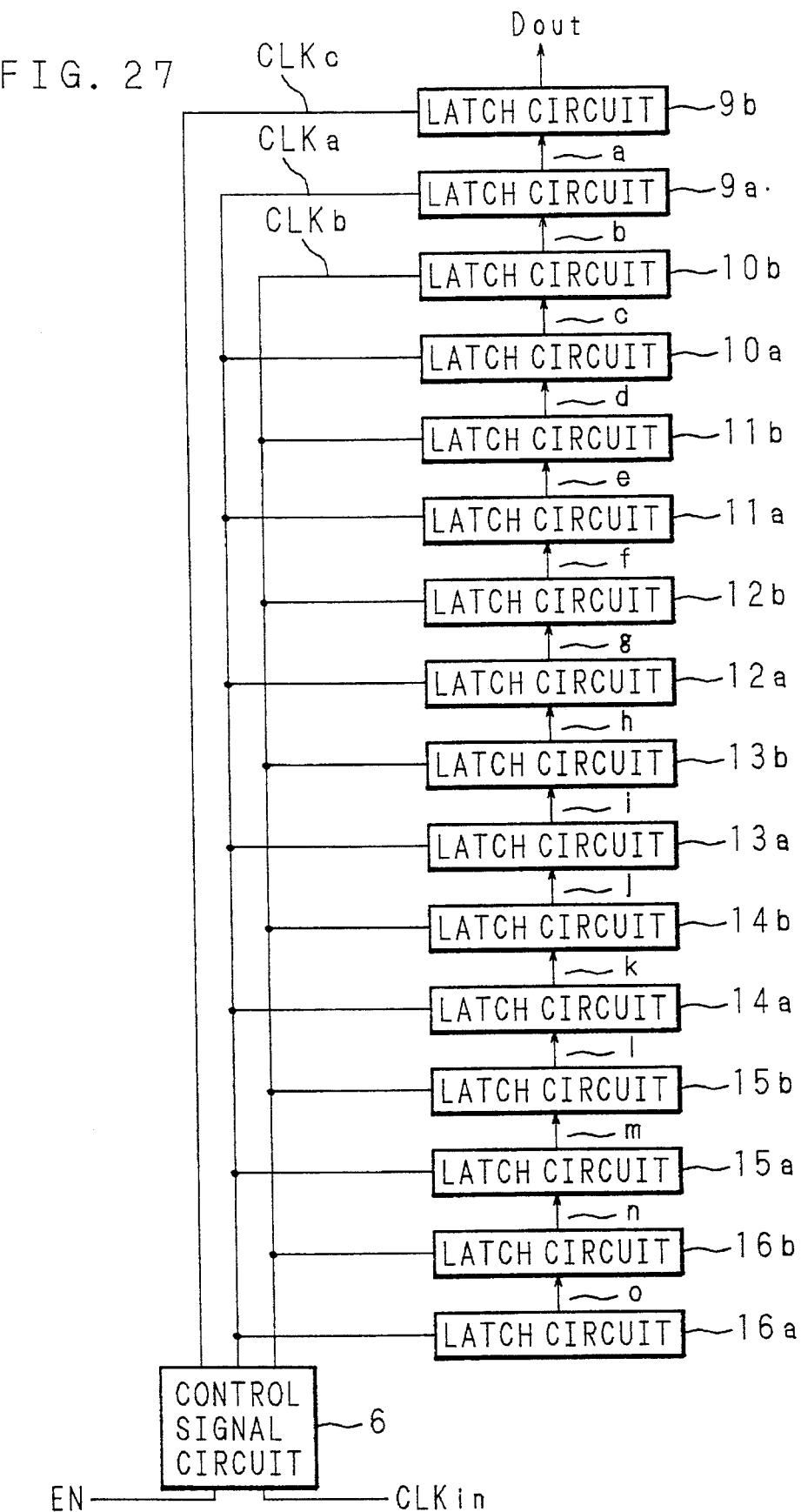
FIG. 27 is a block diagram showing an example of configuration of a transmit unit of a fifth invention.

In FIG. 27, numeral 6 designates a control signal circuit. The control signal circuit 6, though its internal configuration is to be described later, outputs a first control signal, wherein a time at which the output changes to valid from invalid by transition of the clock CLKin, which is the input signal, to the high level from the low level is after than a time at which the output changes to invalid from valid by transition of the clock CLKin to the low level from the high level, a second control signal, wherein a time at which the output changes to valid from invalid by transition of the clock CLKin to the low level from the high level is after than a time at which the output changes to invalid from valid by transition of the clock CLKin to the high level from the low level, and a third control signal, which is invalid when the clock CLKin is at the high level and valid when the input is at the low level.

Numerals 9a to 16a and 10b to 16b designate latch circuits which change the outputs responsive to the control signals outputted from the control signal circuit 6. Where, the latch circuits 9a to 16a are operated by the first control signal outputted from the control signal circuit 6, and the latch circuits 10b to 16b are operated by the second control signal outputted form the control signal circuit 6.

Numeral 37 designates a latch circuit operated by the third control signal of the control circuit signal 6.

These latch circuits are interconnected as follows; an output of the latch circuit 16a is inputted to the latch circuit 16b, an output of the latch circuit 16b is inputted to the latch circuit 15a, an output of the latch circuit 15a is inputted to the latch circuit 15b, an output of the latch circuit 15b is inputted to the latch circuit 14a, an output of the latch circuit 14a is inputted to the latch circuit 14b, an output of the latch circuit 14b is inputted to the latch circuit 13a, an output of the latch circuit 13a is inputted to the latch circuit 13b, an output of the latch circuit 13b is inputted to the latch circuit 12a, an output of the latch circuit 12a is inputted to the latch circuit 12b, an output of the latch circuit 12b is inputted to the latch circuit 11a, an output of the latch circuit 11a is inputted o the latch circuit 11b, an output of the latch circuit 11b is inputted to the latch circuits 10a, an output of the latch circuit 10a is inputted to the latch circuit 10b, an output of the latch circuit 10b is inputted to the latch circuit 9a, and an output of the latch circuit 9a is inputted to the latch circuit 37. An output Dout is outputted as communication data 5.

Though the operation of the transmit unit of the clocked serial I/O shown in FIG. 27 is described with reference to a timing chart shown in FIG. 28, for the convenience' sake of description, the signals are coded so that FIG. 27 and FIG. 28 correspond with each other.

The first control signal of the control signal circuit 6 is designated CLKa, the second control signal is designated CLKb, the third control signal is designated CLKc, the output of the latch circuit 9a is designated a, the output of the latch circuit 10b is designated b, the output of the latch circuit 10a is designated d, the output of the latch circuit 11b is designated d, the output of the latch circuit 11a is designated e, the output of the latch circuit 12b is designated f, the output of the latch circuit 12a is designated g, the output of the latch circuit 13b is designated h, the output of the latch circuit 13a is designated i, the output of the latch circuit 14b is designated j, the output of the latch circuit 14a is designated k, the output of the latch circuit 15b is designated l, the output of the latch circuit 15a is designated m, the output of the latch circuit 16b is designated n and the output of the latch circuit 16a is designated o.

Since the occurrence of noises in the communication clock 3 is different between the time point outputted from the receiving unit 2 of the clocked serial I/O, and the time point inputted to the transmit unit 1 of the clocked serial I/O, the communication clock 3 seen at the transmit unit 1 of the clocked serial I/O is designated CLKin to distinguish the difference.

Next, the operation of the configuration shown in FIG. 27 is described using the same data "b00110110" as the case of description of FIG. 12.

At first, data are latched in the latch circuits as follows; "0" is latched in the latch circuit 10b, "0" is latched in the latch circuit 11b, "1" is latched in the latch circuit 12b, "1" is latched in the latch circuit 13b, "0" is latched in the latch circuit 14b, "1" is latched in the latch circuit 15b, "1" is latched in the latch circuit 6b, and "0" is latched in the latch circuit 16a.

Since the CLKa is valid and the CLKb is invalid, outputs of the latch circuits are that, a is "0", b is "0", c is "0", d is "0", e is "1", f is "1", g is "1", h is "1", i is "0", j is "0", k is "1", l is "1", m is "1", n is "1" and o is "0".

Figure 28:
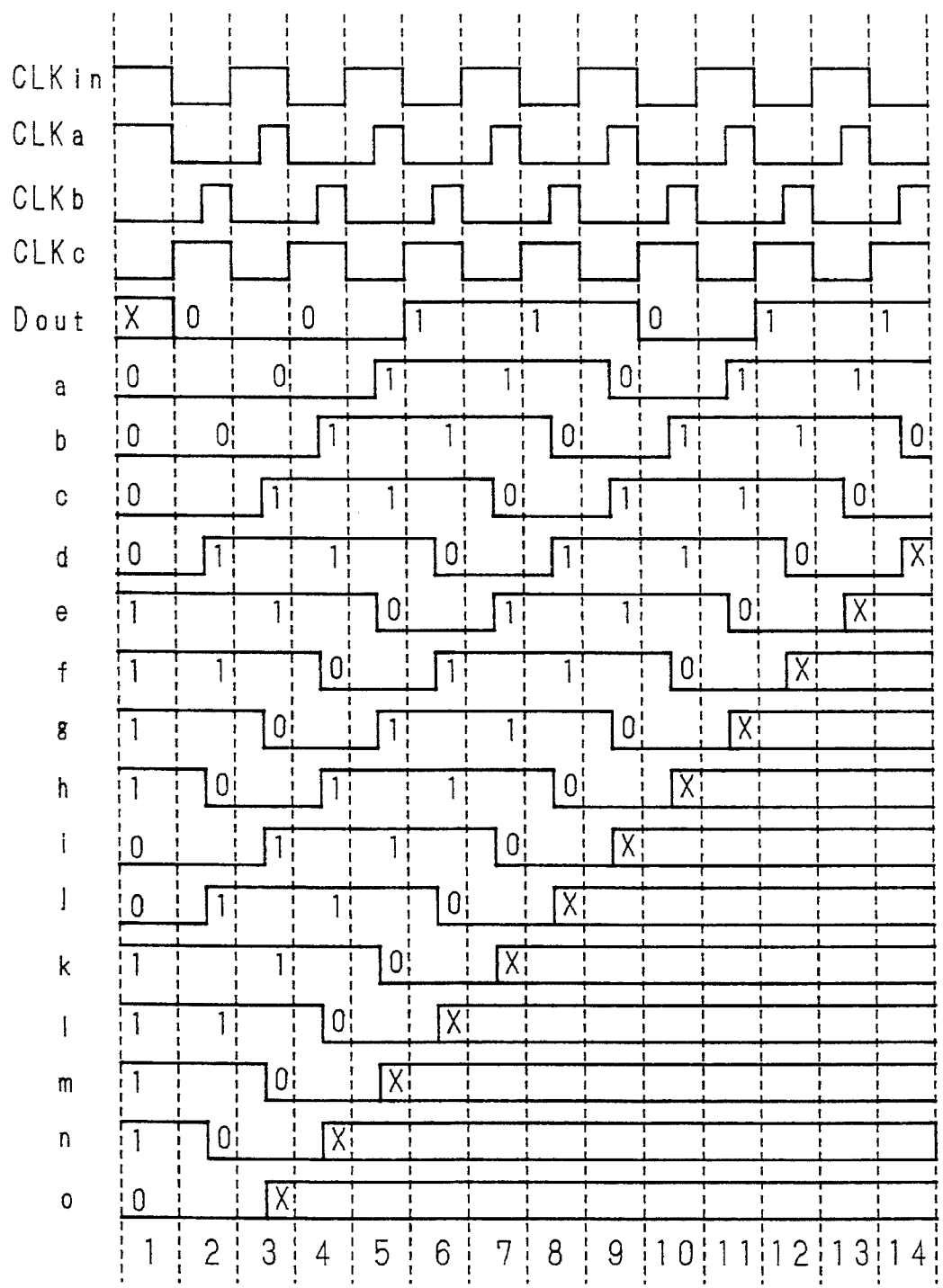
FIG. 28 is a timing chart showing an example of operation of transmit unit of FIG. 27.

This state is shown in a first cycle in FIG. 28.

Next, when the communication clock 3 changes to the low level from the high level, the CLKin transits to the low level form the high level, judging that this level has continued, the control signal circuit 6 changes the CLKa to invalid from valid, the CLKb to valid from invalid and CLKc to valid from invalid. Thereby, the latch circuits 9a to 16a latch the inputs respectively, and the latch circuits 10b to 16b transmit the inputs to the outputs respectively.

This state is shown in a second cycle in FIG. 28.

Outputs of the latch circuits are that; Dout is "0", a is "0", b is "0", c is "0", d is "1", e is "1", f is "1", g is "1", h is "0", i is "0", j is "1", k is "1", l is "1", m is "1", n is "0" and o is "0".

As such, data are shifted between the latch circuits 9a to 16a and 10b to 16b as delaying slightly with respect to edges of the clock CLKin, and only the latch circuit 37 outputs the data at the falling edge of the clock CLKin.

Next, a specific configuration of the control signal circuit 6 is described with reference to FIG. 29 and FIG. 30.

Figure 29:
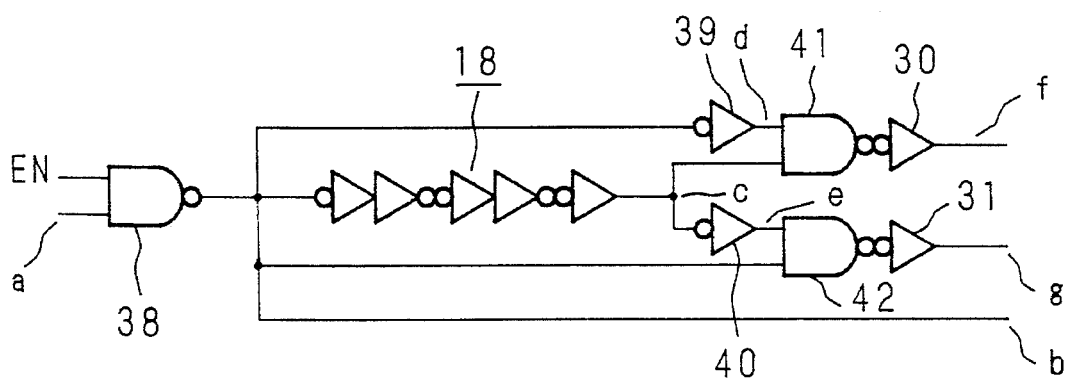
FIG. 29 is a circuit diagram showing an example of logical configuration of a control signal circuit of a transmit unit of a fifth invention.
Figure 30:
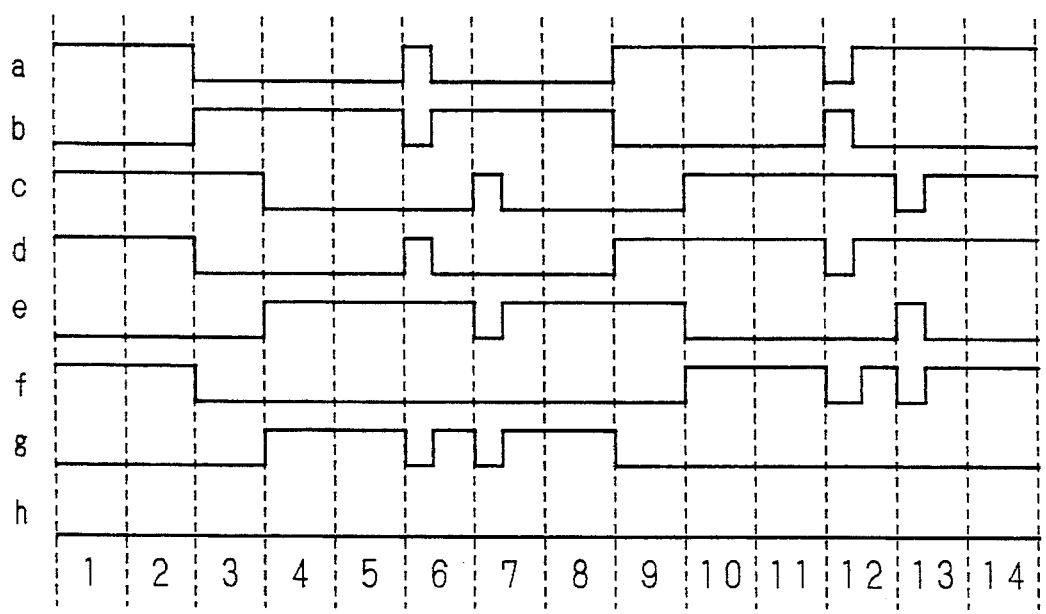
FIG. 30 is a timing chart showing an example of operation of a control signal circuit of FIG. 29.

In FIG. 29 and FIG. 30, numeral 38 designates NAND gate. The NAND gate 38 obtains and outputs an AND logic of the clock CLKin, which is the input to the control signal circuit 6, and the enable signal permitting the operation of the control signal circuit 6. An output of the NAND 38 gate is the third control signal.

Numeral 18 designates a delay element, to which the output of the NAND gate 38 is inputted, constituted by inverter elements of odd numbers.

Numeral 39 designates an inverter element which inverts the output of the NAND gate 38, and numeral 40 designates an inverter element which inverts the output of the delay element 18.

Numeral 41 designates a NAND gate which obtains an AND logic of the output of the inverter element 39 and the output of the delay element 18, and numeral 42 designates a NAND gate which obtains an AND logic of an output of the inverter element 40 and the output of the NAND gate 38.

Numeral 30 designates an inverter element which inverts an output of the NAND gate 41, and its output signal is the first control signal. Numeral 31 designates an inverter element which inverts an output of the NAND gate 42, and its output is the second control signal.

In FIG. 29, an input signal to the control signal circuit 6 is designated a, the output of the NAND gate 38 is designated b, the output of the delay element is designated c, the output of the inverter element 39 is designated d, the output of the inverter element 40 is designated e, the output of the inverter element 30 is designated f and the output of the inverter element 31 is designated g.

Next, the operation of the control signal circuit 6 is described.

When the enable signal is not at the high level, independent of the input signal a, the output f of the inverter element 30 is always at the low level, the output g of the inverter element 31 is at the high level and the output b of the NAND gate 38 is at the high level. Hereinafter, as to the enable signal, only the case of high level is described.

When the input signal a is at the high level, the output b of the NAND gate 38 is at the low level, the output c of the delay element 18 is at the high level, the output d of the inverter element 39 is at the high level, the output e of the inverter element 40 is at the low level, the output f of the inverter element 30 is at the high level and the output g of the inverter element 31 is at the low level.

This state is shown in the first and second cycles in FIG. 30.

Next, when the input signal a transits to the low level from the high level, the output b of the NAND gate 38 changes to the high level, the output c of the delay element 18 keeps the high level without change, the output d of the inverter element 39 changes to the low level, the output e of the inverter element 40 still keeps the low level, the output f of the inverter element 30 changes to the low level, and the output g of the inverter element 31 keeps the low level.

This state is shown in a third cycle in FIG. 30.

When the input signal a keeps the low level, the output b of the NAND gate 38 is kept at the high level as it is, the output c of the delay element 18 changes to the low level, the output d of the inverter element 39 changes to the low level, the output e of the inverter element 40 changes to the high level, the output f of the inverter element 30 is kept at the low level as it is and the output g of the inverter element 31 changes to the high level.

This state is shown in a fourth cycle in FIG. 30.

Next, when the input signal a has instantaneously changed to the high level during the low level, though the output b of the NAND gate 38 instantaneously changes to the low level from the high level, it returns to the high level. The output c of the delay element 18 keeps the low level without change, and the output d of the inverter element 39 instantaneously changes to the high level from the low level, and returns to the low level. The output e of the inverter element 40 still keeps the low level, the output f of the inverter element 30 changes to the low level, and the output g of the inverter element 31 returns to the high level immediately after changing to the low level from the high level.

This state is shown in a sixth cycle in FIG. 30.

When delay of the input is transmitted to the output c of the delay element 18, the output e of the inverter element 40 returns to the high level immediately after changing instantaneously to the low level, and also the output b of the inverter element 31 returns immediately to the high level, although changes instantaneously to the low level.

This state is shown in a seventh cycle in FIG. 30.

Since the output f of the inverter element 30 is kept at the low level as it is, even when the output g of the inverter element 31 and the output b of the NAND gate 38 swing, the latch circuits 9a to 16a, 10b to 16b and 37 are not shifted, so that the noises are absorbed.

Similarly, in twelfth and thirteenth cycles of FIG. 30 the output b of the NAND gate 38 instantaneously changes to the high level, thereby the shifting condition of data from the latch circuit 9a to the latch circuit 37 is completed.

Next, elimination of noises is described.

Figure 31:
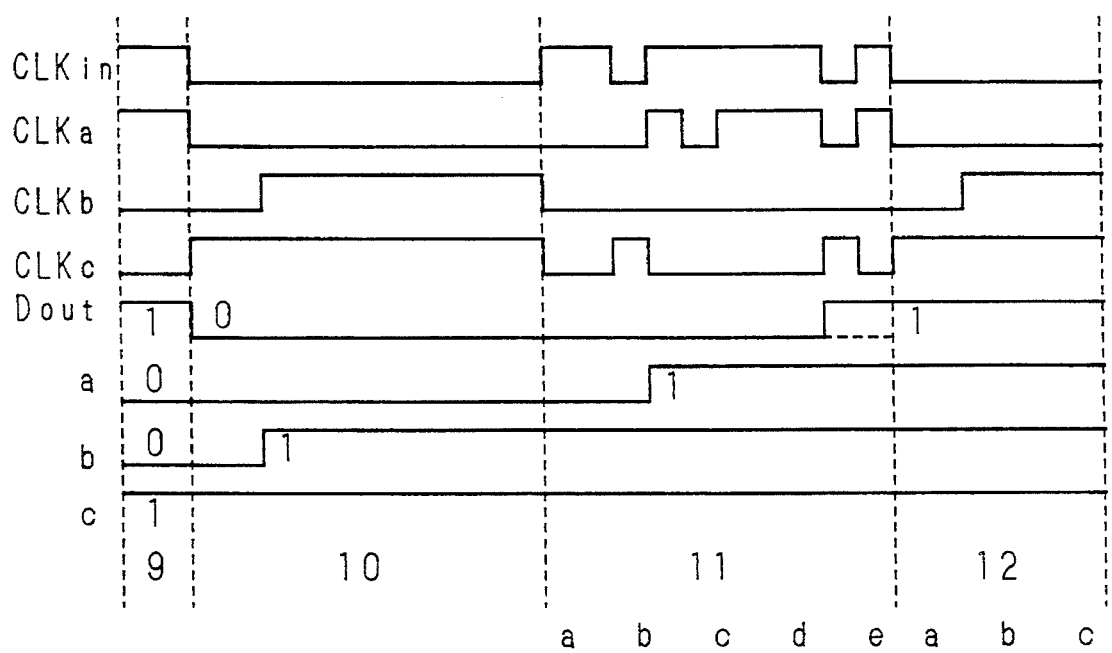
FIG. 31 is a timing chart showing an example of operation of a transmit unit of FIG. 27.

FIG. 31 shows an enlarged timing chart of a portion between a and c in the ninth to twelfth cycles of FIG. 28. The case, where the noise occurred at a timing immediately after the rising of the CLKin shown by the 11b in FIG. 31, and at a timing immediately before the falling of the CLKin shown by 11e, is shown.

As the timing shown by 11b in FIG. 31, even when the CLKc changes to the high level before the rising of the CLKa, data is not shifted and is not affected by the noise. Also, as the timing shown by 11e in FIG. 31, when the CLKc changes to the high level in a state where the CLKa has changed once to the high level, since the data is shifted by the latch circuit 9a, "1" is outputted at the output Dout.

Though, originally, "1" is to be outputted at the portion indicated by broken lines, it is outputted at the timing little earlier. However, it is not a problem, because the receiving unit 2 of the clocked serial I/O latches the data sent from the transmit unit 1 of the clocked serial I/O at the first transition of the CLKin.

As such, also in the fourth embodiment of the present invention, there is not influence of noises.

As described heretofore, the clocked serial I/O of the present invention is that, since a shifter constituted by the master-slave latch circuits does not operate erroneously even when the noise occurs in the communication clock, such situation as jumping of data to the other position or double writing is avoided, and the data can be transmitted and received correctly, improving reliability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A transmit unit of a clock synchronous serial information transfer apparatus which transmits an information signal from a transmitting terminal in synchronism with a clock signal supplied from a receiving unit, comprising:

a control signal circuit for providing a first control signal and a second control signal responsive to a level of said clock signal, said first and second control signals having a complementary valid/invalid relation;

a plurality of first signal holding circuits each having a control terminal receiving said first control signal, an input terminal receiving an input signal and an output terminal providing an output signal; and a plurality second signal holding circuits each having a control terminal receiving said second control signal, an input terminal receiving an input signal and an output terminal providing an output signal, wherein the output signal of respective first signal holding circuits is provided as the input signal received at the input terminal of corresponding second signal holding circuits and the output signal of respective second signal holding circuits are provided as the input signal received at the input terminal of corresponding first signal holding circuits, said corresponding first signal holding circuits provide the input signal received at the input terminal as the output signal when said first control signal is valid, and when the first control signal is invalid, continuously provide the output signal from output terminal, independent of the input signal received at the input terminal, said corresponding second signal holding circuits provide the input signal received at the input terminal as the output signal when said second control signal is valid, and when the second control signal is invalid, continuously provide the output signal from output terminal, independent of the input signal received at the input terminal, the plurality of first and second signal holding circuits are connected to provide said information signal transmitted from the transmitting terminal, and said control signal circuit comprises detecting means for detecting a transition of the level of said clock signal and changing the valid/invalid relation of the first and second control signal only when the detected transition level of the clock signal continues for a predetermined time.

2. A receiving unit of a clock synchronous serial information transfer apparatus which receives an information signal transmitted from a transmit unit from a receiving terminal in synchronism with an externally supplied clock signal, comprising:

a control signal circuit for providing a first control signal and a second control signal responsive to a level of said clock signal, said first and second control signals having a complementary valid/invalid relation;

a plurality of first signal holding circuits each having a control terminal receiving said first control signal, an input terminal receiving an input signal and an output terminal providing an output signal; and a plurality of second signal holding circuits each having a control terminal receiving said second control signal, an input terminal receiving an input signal and an output terminal providing an output signal, wherein the output signal of respective first signal holding circuits is provided as the input signal received at the input terminal of corresponding second signal holding circuits and the output signal of respective second signal holding circuits are provided as the input signal received at the input terminal of corresponding first signal holding circuits, said corresponding first signal holding circuits provide the input signal received at the input terminal as the output signal when said first control signal is valid, and when the first control signal is invalid, continuously provide the output signal from output terminal, independent of the input signal received at the input terminal, said corresponding first signal holding circuit store the input signal being received at the input terminal when said first control signal is valid, and when the first control signal is invalid, provide the stored signal as the output signal from output terminal, said corresponding second signal holding circuit store the input signal being received at the input terminal when said second control signal is valid, and when the second control signal is invalid, provide the stored signal as the output signal from output terminal, the plurality of first and second signal holding circuits are connected through respective input and output terminals to receive said information signal received at the receiving terminal, and said control signal circuit comprises detecting means for detecting a transition of the level of said clock signal and changing the valid/invalid relation of the first and second control signal only when the detected transition level of the clock signal continues for a predetermined time.

3. A transmit unit of a clock synchronous serial information transfer apparatus which transmits an information signal from a transmitting terminal in synchronism with a clock signal supplied from a receiving unit, comprising: p1 a first a control signal circuit for providing a first control signal responsive to a level of said clock signal;

a second a control signal circuit for providing a second control signal responsive to a level of said clock signal, said first and second control signals having a complementary valid/invalid relation;

a plurality of first signal holding circuits each having a control terminal receiving said first control signal, an input terminal receiving an input signal and an output terminal providing an output signal; and a plurality second signal holding circuits each having a control terminal receiving said second control signal, an input terminal receiving an input signal and an output terminal providing an output signal, wherein the output signal of respective first signal holding circuits is provided as the input signal received at the input terminal of corresponding second signal holding circuits and the output signal of respective second signal holding circuits are provided as the input signal received at the input terminal of corresponding first signal holding circuits, said corresponding first signal holding circuits provide the input signal received at the input terminal as the output signal when said first control signal is valid, and when the first control signal is invalid, continuously provide the output signal from output terminal, independent of the input signal received at the input terminal, said corresponding second signal holding circuits provide the input signal received at the input terminal as the output signal when said second control signal is valid, and when the second control signal is invalid, continuously provide the output signal from output terminal, independent of the input signal received at the input terminal, the plurality of first and second signal holding circuits are connected to provide said information signal transmitted from the transmitting terminal, said first control signal output circuit comprises means for delaying a time at which said first control signal becomes valid responsive to transition of the clock signal from a second level to a first level, and a time at which said first control signal becomes invalid responsive to transition of the clock signal from the first level to the second level, and said second control signal output circuit comprises means for delaying a time at which said second control signal becomes valid responsive to transition of the clock signal from the first level to the second level, and a time at which said second control signal becomes invalid responsive to transition of the clock signal from the second level to the first level.

4. A receiving unit of a clock synchronous serial information transfer apparatus which receives an information signal transmitted from a transmit unit from a receiving terminal in synchronism with an externally supplied clock signal, comprising:

a first a control signal circuit for providing a first control signal responsive to a level of said clock signal;

a second a control signal circuit for providing a second control signal responsive to a level of said clock signal, said first and second control signals having a complementary valid/invalid relation;

a plurality of first signal holding circuits each having a control terminal receiving said first control signal, an input terminal receiving an input signal and an output terminal providing an output signal; and a plurality of second signal holding circuits each having a control terminal receiving said second control signal, an input terminal receiving an input signal and an output terminal providing an output signal, wherein the output signal of respective first signal holding circuits is provided as the input signal received at the input terminal of corresponding second signal holding circuits and the output signal of respective second signal holding circuits are provided as the input signal received at the input terminal of corresponding first signal holding circuits, said corresponding first signal holding circuits provide the input signal received at the input terminal as the output signal when said first control signal is valid, and when the first control signal is invalid, continuously provide the output signal from output terminal, independent of the input signal received at the input terminal, said corresponding first signal holding circuit store the input signal being received at the input terminal when said first control signal is valid, and when the first control signal is invalid, provide the stored signal as the output signal from output terminal, said corresponding second signal holding circuit store the input signal being received at the input terminal when said second control signal is valid, and when the second control signal is invalid, provide the stored signal as the output signal from output terminal, the plurality of first and second signal holding circuits are connected through respective input and output terminals to receive said information signal received at the receiving terminal, said first control signal output circuit comprises means for delaying a time at which said first control signal becomes valid responsive to transition of the clock signal from a second level to a first level, and a time at which said first control signal becomes invalid responsive to transition of the clock signal from the first level to the second level, and said second control signal output circuit comprises means for delaying a time at which said second control signal becomes valid responsive to transition of the clock signal from the first level to the second level, and a time at which said second control signal becomes invalid responsive to transition of the clock signal from the second level to the first level.

5. A transmit unit of a clock synchronous serial information transfer apparatus which transmits an information signal from a transmitting terminal in synchronism with a clock signal supplied from a receiving unit, comprising:

a clock input terminal which inputs said clock signal;

a control output circuit having an input terminal connected to said clock input terminal, a first control output terminal, a second control output terminal and a third control output terminal, said control output circuit, responsive to a transition of said clock signal from a first level to a second level, outputting (i) a valid control signal from said first control output terminal, (ii) an invalid control signal from said second control output terminal, and (iii) a valid control signal from said third control output terminal at (a) a time later than a time when the valid control signal is outputted form said first control output terminal, and (b) a time when the invalid control signal is outputted from said second control output terminal, and said control output circuit, responsive to a transition of said clock signal from the second level to the first level, outputting (i) an invalid control signal from said first control output terminal, (ii) an invalid control signal from said third control output terminal, and (iii) a valid control signal from second control output terminal at (a) a time later than a time when the invalid control signal is outputted form said first control output terminal, and (b) a time when the invalid control signal is outputted from said third control output terminal, a first signal holding circuit which has an input terminal receiving an input signal, a control terminal connected to said first control output terminal and output terminal providing an output signal to said transmitting terminal, said first signal holding circuit providing the input signal received at the input terminal as the output signal from the output terminal when a valid control signal is received at the control terminal, and continuously providing the output signal from output terminal, independent of the input signal received at the input terminal, a plurality of second signal holding circuits each having a control terminal connected to said second control output terminal, an input terminal receiving an input signal and an output terminal providing an output signal; and a plurality third signal holding circuits each having a control terminal connected to said third control output terminal, an input terminal receiving an input signal and an output terminal providing an output signal, wherein the output signal of respective second signal holding circuits is provided as the input signal received a the input terminal of corresponding third signal holding circuits and the output signal of respective third signal holding circuits are provided as the input signal received at the input terminal of corresponding second signal holding circuits, said corresponding second signal holding circuits provide the input signal received at the input terminal as the output signal when a valid control signal is received at the respective control terminals connected to the second control output terminal, and when an invalid control signal is received, continuously provide the output signal from output terminal, independent of the input signal received at the input terminal, and said corresponding third signal holding circuits provide the input signal received at the input terminal as the output signal when a valid control signal is received at the respective control terminals connected to the third control output terminal, and when an invalid control signal is received, continuously provide the output signal from output terminal, independent of the input signal received at the input terminal.

6. A transmit unit of a clock synchronous serial information transfer apparatus as set forth in claim 1, wherein the same number of said first signal holding circuits and said second signal holding circuits as the number of bits of information to be transmitted are connected alternately in series.

7. A receiving unit of a clock synchronous serial information transfer apparatus as set forth in claim 2, wherein the same number of said first signal holding circuits and said second signal holding circuits as the number of bits of information to be transmitted are connected alternately in series.

8. A transmit unit of a clock synchronous serial information transfer apparatus as set forth in claim 3, wherein the same number of said first signal holding circuits and said second signal holding circuits as the number of bits of information to be transmitted are connected alternately in series.

9. A receiving unit of a clock synchronous serial information transfer apparatus as set forth in claim 4, wherein the same number of said first signal holding circuits and said second signal holding circuits as the number of bits of information to be transmitted are connected alternately in series.

10. A transmit unit of a clock synchronous serial information transfer apparatus as set forth in claim 5, wherein said second signal holding circuits which are one less than the number of bits of information to be transmitted, and the same number of said third signal holding circuits as the number of bits of information to be transmitted are connected alternately in series.

* * * * *